(12) United States Patent
Eda

(10) Patent No.: US 8,798,245 B2
(45) Date of Patent: Aug. 5, 2014

(54) COMMUNICATION TERMINAL APPARATUS

(75) Inventor: Noriyuki Eda, Minato-ku (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/618,566

(22) Filed: Sep. 14, 2012

(65) Prior Publication Data

US 2013/0013715 A1    Jan. 10, 2013

Related U.S. Application Data

(63) Continuation of application No. 11/679,875, filed on Feb. 28, 2007, now Pat. No. 8,300,800.

(30) Foreign Application Priority Data

Mar. 10, 2006 (JP) ................................ 2006-066570

(51) Int. Cl.
*H04M 11/00* (2006.01)
(52) U.S. Cl.
USPC .................................................... 379/100.08
(58) Field of Classification Search
USPC .............. 379/100.08, 93.24, 265.09, 221.14, 379/67.1, 51, 88.08, 88.12, 88.22, 93.01; 709/206, 211
See application file for complete search history.

(56) References Cited

U.S. PATENT DOCUMENTS

| 7,113,976 | B2 | 9/2006 | Watanabe |
| 7,574,477 | B2* | 8/2009 | Nagai ........................... 709/206 |
| 2002/0118396 | A1 | 8/2002 | Kawai |
| 2003/0236847 | A1* | 12/2003 | Benowitz et al. ............. 709/206 |
| 2005/0086171 | A1 | 4/2005 | Abe et al. |

FOREIGN PATENT DOCUMENTS

| JP | 05-316145 A | 11/1993 |
| JP | 2001197101 A | 7/2001 |

* cited by examiner

*Primary Examiner* — Duc Nguyen
*Assistant Examiner* — Yosef K Laekemariam
(74) *Attorney, Agent, or Firm* — Panitch Schwarze Belisario & Nadel LLP

(57) ABSTRACT

A communication terminal apparatus is provided that is capable of sending and receiving an e-mail, includes an e-mail address storage unit storing recipient information of an e-mail address, a mail analysis unit for analyzing whether the subject area of a received e-mail includes a first prescribed symbol, an e-mail address acquisition unit for acquiring a sender's e-mail address from the received e-mail, and an e-mail address registration unit for registering the sender's e-mail address of the received e-mail with the e-mail address storage unit where the subject area of the received e-mail includes the first prescribed symbol. The communication terminal apparatus advantageously relieves users from cumbersome task of entry of recipients' e-mail addresses and makes the entry of the e-mail addresses accurately stored.

11 Claims, 31 Drawing Sheets

FLOWCHART SHOWING OVERALL THE OPERATION OF THE MULTIFUNCTIONAL DEVICE ACCORDING TO THE FIRST EMBODIMENT OF THIS INVENTION

CONCEPTUAL DIAGRAM SHOWING THE E-MAIL RECEIVED EXTERNALLY
ACCORDING TO THE FIRST EMBODIMENT OF THIS INVENTION

FLOWCHART SHOWING THE OPERATION OF THE E-MAIL PARSER
ACCORDING TO THE FIRST EMBODIMENT OF THIS INVENTION

FLOWCHART SHOWING THE OPERATION OF THE SUBJECT DETERMINATION UNIT ACCORDING TO THE FIRST EMBODIMENT OF THIS INVENTION

FLOWCHART SHOWING THE OPERATION OF THE SENDER'S E-MAIL ADDRESS REGISTRATION UNIT ACCORDING TO THE FIRST EMBODIMENT OF THIS INVENTION

FLOWCHART SHOWING THE OPERATION OF THE CONTROL UNIT MONITORING THE E-MAIL ADDRESS REGISTRATION PROCESS ACCORDING TO THE FIRST EMBODIMENT OF THIS INVENTION

FLOWCHART SHOWING THE OPERATION OF THE RECEIVED E-MAIL
DELETION UNIT ACCORDING TO THE FIRST EMBODIMENT OF THIS INVENTION

FLOWCHART SHOWING THE OPERATION OF THE E-MAIL GENERATION UNIT ACCORDING TO THE FIRST EMBODIMENT OF THIS INVENTION

FLOWCHART SHOWING THE OPERATION OF THE E-MAIL SENDER UNIT
ACCORDING TO THE FIRST EMBODIMENT OF THIS INVENTION

CONCEPTUAL DIAGRAM SHOWING THE REGISTRATION
COMPLETION NOTIFICATION E-MAIL

FIG. 13

|    | E-MAIL ADDRESS LIST | TIME AS TO WHEN THE E-MAIL ADDRESS WAS REGISTERED |
|----|--------------------|---------------------------------------------------|
| 01 | alpha@123.com      | 2005-06-07 10:00                                  |
| 02 | bravo@123.com      | 2005-05-04 10:00                                  |
| 03 | charlie@123.com    | 2005-04-04 10:00                                  |
| 04 | foxtrot@123.com    | 2005-03-05 12:00                                  |
| 05 | golf@123.com       | 2005-02-03 13:00                                  |
| 06 |                    |                                                   |
| 07 |                    |                                                   |

TABLE A

SUPPOSE THAT THE MULTIFUNCTION DEVICE CONTAINING THE AVOVE E-MAIL ADDRESS LIST RECEIVES AN E-MAIL, AT 10 O'CLOCK ON OCTOBER 7, 2005, REQUESTING THE REGISTRATION OF ECHO@123.COM. AFTER THE E-MAIL ADDRESS HAS BEEN REGISTERED, THE BELOW LIST WILL BE DISPLAYED IF THE CONTROL UNIT 23 REQUESTS THE DISPLAY UNIT 24 TO DISPLAY THE E-MAIL ADDRESS LIST.

THE DISPLAY OF THE E-MAIL ADDRESS LIST WHERE THE DISPLAY REQUEST IS REQUESTED WITHIN LESS THAN THE PRESCRIBED TIME AFTER THE E-MAIL ADDRESS REGISTRATION

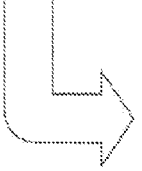

|    | E-MAIL ADDRESS LIST | TIME AS TO WHEN THE E-MAIL ADDRESS WAS REGISTERED |
|----|--------------------|---------------------------------------------------|
| 01 | echo@123.com       | 2005-10-07 10:00                                  |
| 02 | alpha@123.com      | 2005-08-07 10:00                                  |
| 03 | bravo@123.com      | 2005-05-04 10:00                                  |
| 04 | charlie@123.com    | 2005-04-04 10:00                                  |
| 05 | foxtrot@123.com    | 2005-03-05 10:00                                  |
| 06 | golf@123.com       | 2005-02-03 10:00                                  |
| 07 |                    |                                                   |

TABLE B

THE DISPLAY OF THE E-MAIL ADDRESS LIST WHERE THE DISPLAY REQUEST IS REQUESTED NOT LESS THAN THE PRESCRIBED TIME AFTER THE E-MAIL ADDRESS REGISTRATION

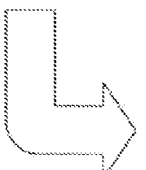

|    | E-MAIL ADDRESS LIST | TIME AS TO WHEN THE E-MAIL ADDRESS WAS REGISTERED |
|----|--------------------|---------------------------------------------------|
| 01 | alpha@123.com      | 2005-08-07 10:00                                  |
| 02 | bravo@123.com      | 2005-05-04 10:00                                  |
| 03 | charlie@123.com    | 2005-04-04 10:00                                  |
| 04 | echo@123.com       | 2005-10-07 10:00                                  |
| 05 | foxtrot@123.com    | 2005-03-05 10:00                                  |
| 06 | golf@123.com       | 2005-02-03 10:00                                  |
| 07 |                    |                                                   |

TABLE C

DIAGRAM FOR EXPLAINING THE FUNCTION OF THE DISPLAY ORDER DETERMINATION UNIT

FLOWCHART SHOWING DISPLAYING OPERATION OF THE MULTIFUNCTION DEVICE ACCORDING TO THE SECOND EMBODIMENT OF THIS INVENTION

BLOCK DIAGRAM SHOWING OVERALL OPERATION OF THE MULTIFUNCTION DEVICE ACCORDING TO THE THIRD EMBODIMENT OF THIS INVENTION

CONCEPTUAL DIAGRAM SHOWING THE E-MAIL RECEIVED EXTERNALLY
ACCORDING TO THE THIRD EMBODIMENT OF THIS INVENTION

FLOWCHART SHOWING THE SUBJECT DETERMINATION UNIT ACCORDING TO THE THIRD EMBODIMENT OF THIS INVENTION

FLOWCHART SHOWING THE OPERATION OF THE CONTROL UNIT MONITORING THE E-MAIL ADDRESS REGISTRATION DELETION PROCESS ACCORDING TO THE THIRD EMBODIMENT OF THIS INVENTION

FLOWCHART SHOWING THE OPERATION OF THE RECEIVED E-MAIL DELETION UNIT
ACCORDING TO THE THIRD EMBODIMENT OF THIS INVENTION

FLOWCHART SHOWING THE OPERATION OF THE E-MAIL GENERATION UNIT
ACCORDING TO THE THIRD EMBODIMENT OF THIS INVENTION

CONCEPTUAL DIAGRAM SHOWING THE REGISTRATION DELETION COMPLETION
NOTIFICATION E-MAIL ACCORDING TO THE THIRD EMBODIMENT OF THIS INVENTION

FLOWCHART SHOWING OVERALL OPERATION OF THE MULTIFUNCTION
DEVICE ACCORDING TO THE FOURTH EMBODIMENT OF THIS INVENTION

CONCEPTUAL DIAGRAM SHOWING THE E-MAIL RECEIVED EXTERNALLY
ACCORDING TO THE FOURTH EMBODIMENT OF THIS INVENTION

FLOWCHART SHOWING THE OPERATION OF THE SUBJECT DETERMINATION UNIT ACCORDING TO THE FOURTH EMBODIMENT OF THIS INVENTION

FLOWCHART SHOWING THE OPERATION OF THE SENDER'S E-MAIL ADDRESS
REGISTRATION UNIT ACCORDING TO THE FOURTH EMBODIMENT OF THIS INVENTION

FLOWCHART SHOWING THE OPERATION OF THE CONTROL UNIT MONITORING THE E-MAIL ADDRESS
LIST GENERATION PROCESS ACCORDING TO THE FOURTH EMBODIMENT OF THIS INVENTION

FLOWCHART SHOWING THE OPERATION OF THE E-MAIL GENERATION UNIT
ACCORDING TO THE FOURTH EMBODIMENT OF THIS INVENTION

FLOWCHART SHOWING THE OPERATION OF THE E-MAIL SENDER UNIT
ACCORDING TO THE FOURTH EMBODIMENT OF THIS INVENTION

CONCEPTUAL DIAGRAM SHOWING THE PRINT COMPLETION NOTIFICATION
E-MAIL ACCORDING TO THE FOURTH EMBODIMENT OF THIS INVENTION

COMMUNICATION TERMINAL APPARATUS

CROSS-REFERENCE TO RELATED APPLICATIONS

This application is a continuation of copending U.S. application Ser. No. 11/679,875 filed Feb. 28, 2007, the entire disclosure of which is incorporated herein by reference.

BACKGROUND OF THE INVENTION

This invention relates to a communication terminal apparatus capable of sending and receiving e-mails.

A multifunction device capable of sending and receiving e-mails as well as scanning and forming images has a so-called scan-and-e-mail function for sending scanned image data as image files attached to an e-mail. The scan-and-e-mail function is frequently used by users, and is one of the functions having high utility value. The scan-and-e-mail function enables the user of the multifunction device to attach scanned image data as image files to an e-mail with the user's own e-mail address specified as the recipient's e-mail address Thus, the user can easily store the received image files in a PC or server, forward the files, and as such.

The scan-and-e-mail function requires a document to be scanned for the generation of image data by the multifunction device and an e-mail address to be specified as the recipient's e-mail address with the multifunction device. To obtain the recipient's e-mail address, generally employed are methods such as follows: that the e-mail address is directly input with the use of operation buttons provided with the multifunction device when the e-mail is sent; that e-mail addresses expected to be specified as recipient's e-mail addresses are previously stored in the multifunction device as an e-mail address list so that the user may select a particular e-mail address from the list when the e-mail is sent, as described in the specification of Japanese Patent Application Publication H05-316145; and that the user pushes a one-touch button previously setting a particular e-mail address with the multifunctional device.

With the direct input method as described above, however, the user is required to input a complicated e-mail address, character by character, in alphabet with the use of the operation buttons provided with the multifunction device. Even with the method of selecting an e-mail address from the list or the method of pushing the one-touch button, the user is required to input complicated e-mail addresses, character by character, in alphabet with the use of the operation buttons provided with the multifunction device at the time of previously registering e-mail addresses. That is, whichever of these prior art methods is employed, the user is required to directly input e-mail addresses by pushing the operation buttons provided with the multifunction device.

This invention has been made to solve such problem that no matter which of the above methods is employed, the user is required to input complicated e-mail addresses, character by character, in alphabet by pushing the operation buttons provided with the multifunction device so as to specify a recipient's e-mail address.

BRIEF SUMMARY OF THE INVENTION

This invention relates to a communication terminal apparatus capable of sending and receiving an e-mail, including an e-mail address storage unit storing recipient information of an e-mail address, a mail analysis unit for analyzing whether the subject area of a received e-mail includes a first prescribed symbol, an e-mail address acquisition unit for acquiring a sender's e-mail address from the received e-mail, and an e-mail address registration unit for registering the sender's e-mail address of the received e-mail with the e-mail address storage unit where the subject area of the received e-mail includes the first prescribed symbol.

A user can register his or her e-mail address with the e-mail address storage unit of the communication terminal apparatus by sending an e-mail containing the first prescribed symbol in the subject to the communication terminal apparatus. This invention is advantageous in relieving the user from a cumbersome task of inputting complicated e-mail addresses, character by character, in alphabet by pushing the operation buttons, and realizing a simple registration process in a shorter time. Furthermore, mistakes in inputting e-mail addresses can be avoided, and a highly convenient multifunction device is provided.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 13 is a diagram for explaining a function of a display order determination unit;

DETAILED DESCRIPTION OF THE INVENTION

Particular embodiments according to this invention is hereinafter described in details with reference to the figures.

The First Embodiment

Figure 1:
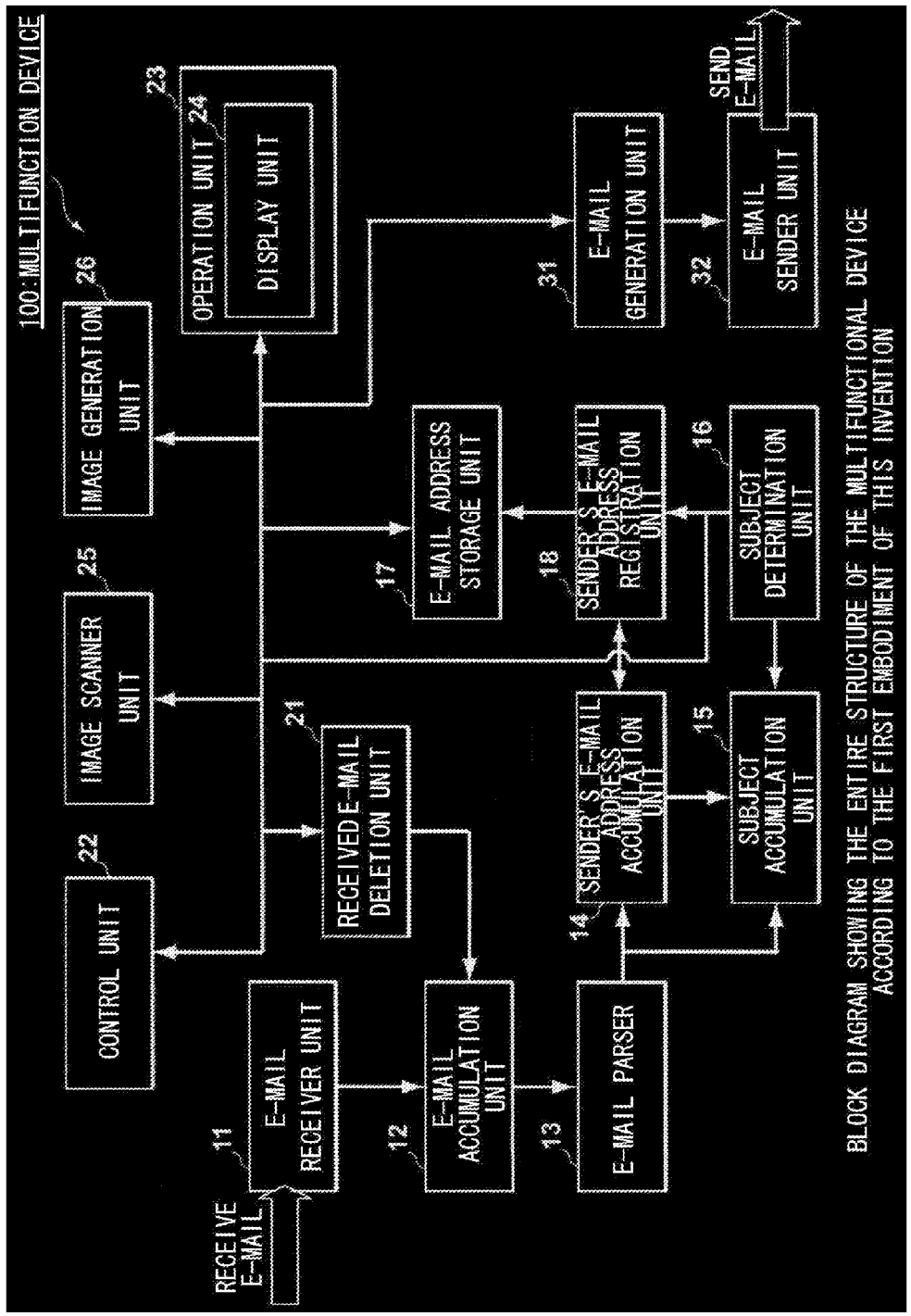
FIG. 1 is a block diagram showing an entire structure of a multifunctional device according to the first embodiment of this invention.

FIG. 1 is the block diagram showing the structure of a multifunction device according to the first embodiment of this invention. A multifunction device 100 capable of sending and receiving e-mails as well as scanning and forming images is structured as shown in FIG. 1. Components forming the multifunction device 100 and functions thereof are described hereinbelow.

In FIG. 1, an e-mail receiver unit 11 receives an e-mail from an external apparatus, not shown. An e-mail accumulation unit 12 is a memory to accumulate, i.e., hold, an e-mail received by the e-mail receiver unit 11. An e-mail parser 13 receives the received e-mail from the e-mail accumulation unit 12, and parses content of the received e-mail so as to extract therefrom a sender's e-mail address and a subject and to store the extracted sender's e-mail address in a sender's e-mail address accumulation unit 14 and the extracted subject in a subject accumulation unit 15. The sender's e-mail address accumulation unit 14 receives the sender's e-mail address from the e-mail parser 13 and temporarily stores the e-mail address. The subject accumulation unit 15 receives the subject from the e-mail parser 13 and temporarily stores the subject.

The subject determination unit 16 determines whether the extracted subject is the same as a subject previously registered with the subject determination unit 16. Where the extracted subject is the same thereas, the subject determination unit 16 notifies the sender's e-mail address registration unit 18 of a registration instruction. An e-mail address storage unit 17 is a memory to additionally store a plurality of e-mail addresses. The sender's e-mail address registration unit 18 registers the sender's e-mail address with the e-mail address storage unit 17 upon receiving the registration instruction from the subject determination unit 16. A received e-mail deletion unit 21 deletes the received e-mail stored in the e-mail accumulation unit 12 upon receiving a notification of e-mail address registration process completion, described later, from a control unit.

A control unit 22 controls the overall operation of the multifunction device, and more particularly, in the present embodiment, the control unit 22 monitors the e-mail address storage unit 17 upon receiving a notification of e-mail address registration process commencement from the subject determination unit 16, and notifies the received e-mail deletion unit 21 and an e-mail generation unit 31 of the e-mail address registration process completion when the sender's e-mail address has been registered with the e-mail address storage unit 17. An operation unit 23 is an operation panel for a user to operate and give instructions to the multifunction device. A display unit 24, arranged on the operation unit 23, is a display panel to display status and operation result of the multifunction device, thus informing the user thereof. An image scanner unit 25 is an image scanning mechanism to retrieve image data from a document to be scanned.

An image generation unit 26 is a print engine mechanism for printing out prescribed image data. The e-mail generation unit 31 generates an e-mail. Particularly in the present embodiment, the e-mail generation unit 31, upon receiving the notification of e-mail address registration process completion from the control unit 22, generates an e-mail to be sent to the e-mail address, registered in the e-mail address registration process, with an attached transmission message for notifying the e-mail address registration completion. The e-mail sender unit 32 sends the e-mail generated by the e-mail generation unit 31 to a prescribed recipient.

Figure 2:
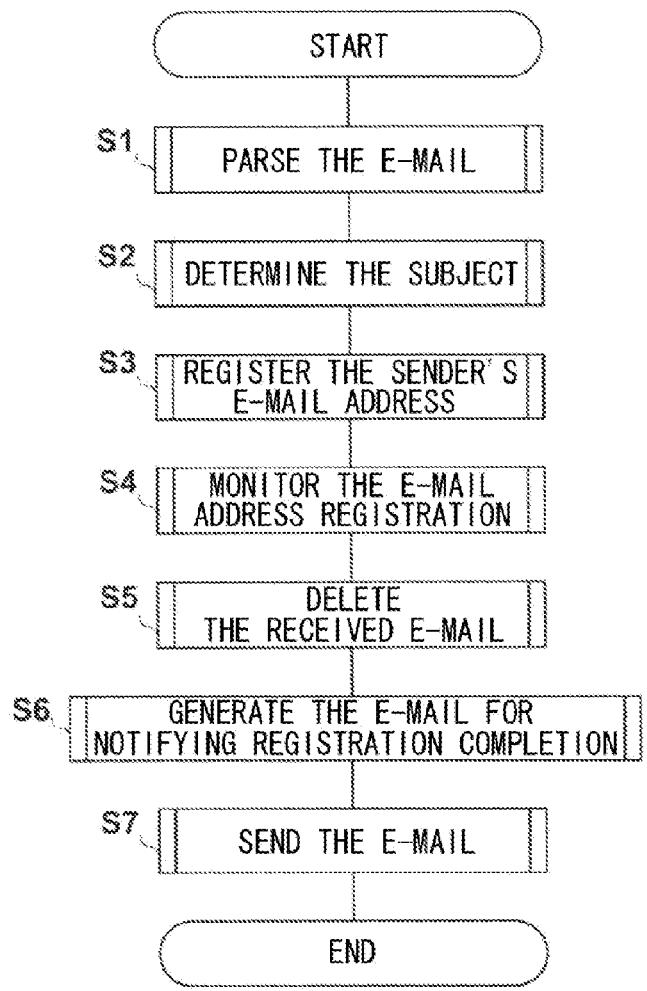
FIG. 2 is a flowchart showing an overall operation of the multifunctional device according to the first embodiment of this invention.
Figure 3:
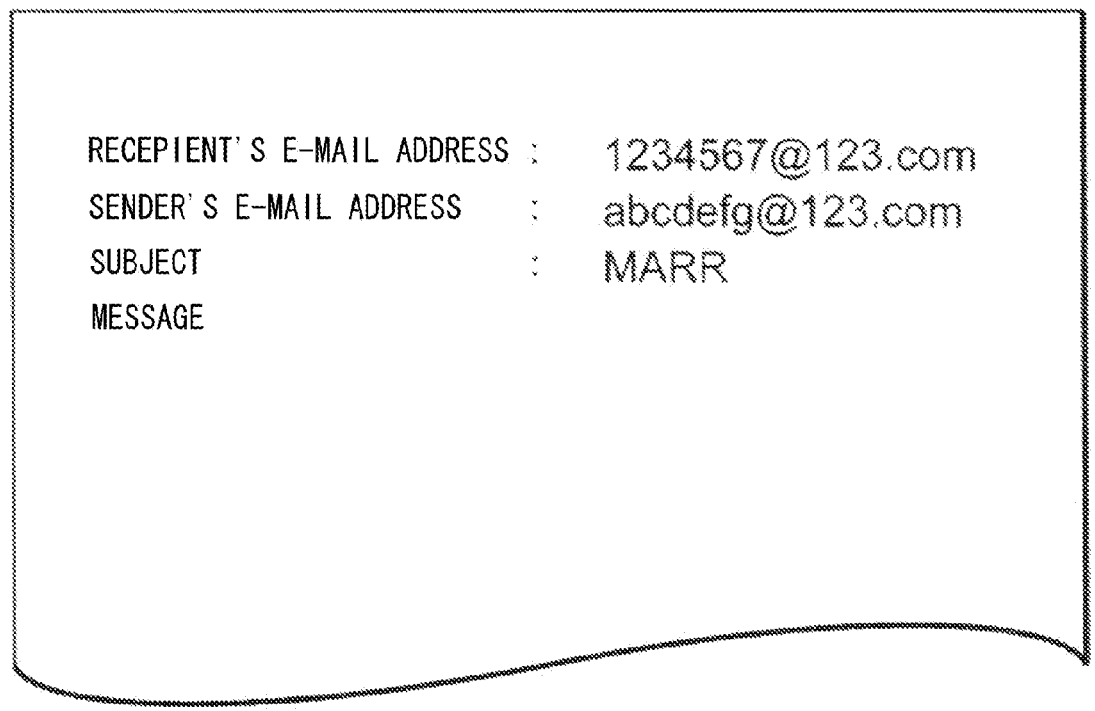
FIG. 3 is a conceptual diagram showing an e-mail received externally in the first embodiment of this invention.

The operation of the multifunction device 100 according to the present embodiment will be hereinafter described. FIG. 2 is the flowchart showing the overall operation of the multifunction device of the first embodiment. Steps S1 through S7 will be described in details in the order of steps with reference to FIG. 1. FIG. 3 is the conceptual diagram showing the e-mail received externally in the first embodiment of this invention.

The multifunction device 100 of the present embodiment receives, for example, the e-mail shown in FIG. 3 from an external apparatus, now shown, via the e-mail receiver unit 11. The received e-mail is stored in the e-mail accumulation unit 12. The received e-mail can be displayed on the display unit 24 upon operation of the operation unit 23, and can be printed by the image forming unit 26. The received e-mail is transferred to the e-mail parser 13, and step S1, namely, the operation of the e-mail parser 13, is performed. The operation of step S1 will be hereinafter described in details.

Figure 4:
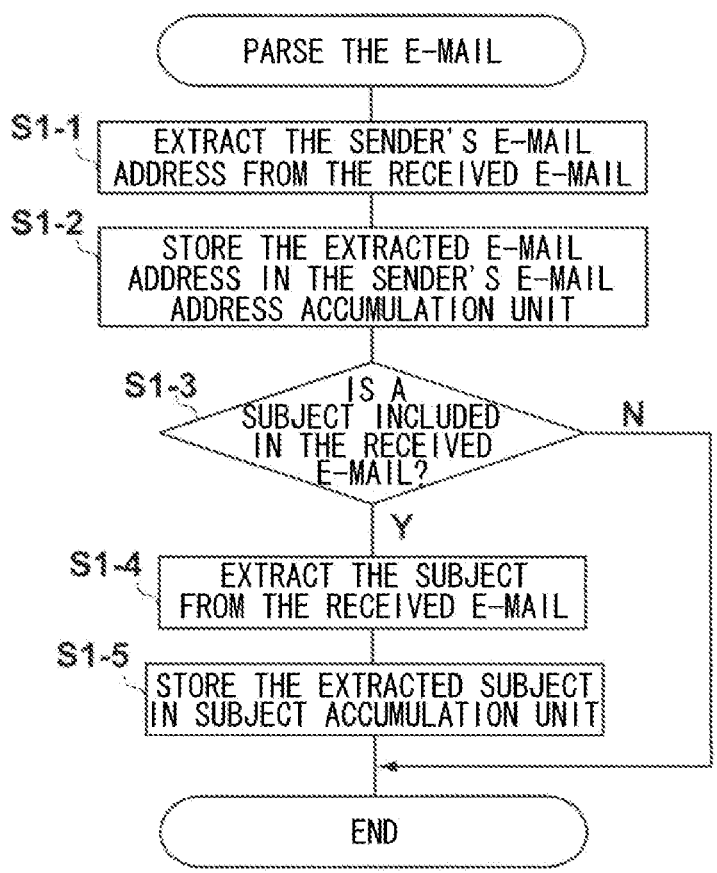
FIG. 4 is a flowchart showing the operation of an e-mail parser according to the first embodiment of this invention.

FIG. 4 is the flowchart showing the operation of the e-mail parser according to the first embodiment of this invention.

In step S1-1, the e-mail parser 13 extracts the sender's e-mail address from the received e-mail. For example, the e-mail parser 13 extracts abcdefg@123.com from the e-mail shown in FIG. 3.

In step S1-2, the e-mail parser 13 stores the extracted sender's e-mail address in the sender's e-mail address accumulation unit 14.

In step S1-3, the e-mail parser 13 determines whether the subject is included in the received e-mail. Where the subject is included therein, step S1-4 is proceeded to. Where not included, this flow is terminated. In the example of FIG. 3, the subject "MARR" is included.

In step S1-4, the e-mail parser 13 extracts the subject from the received e-mail. In the example, the subject "MARR" is extracted from the e-mail shown in FIG. 3.

In step S1-5, the e-mail parser 13 stores the subject extracted from the received e-mail in the subject accumulation unit 15, and then terminates this flow.

Figure 5:
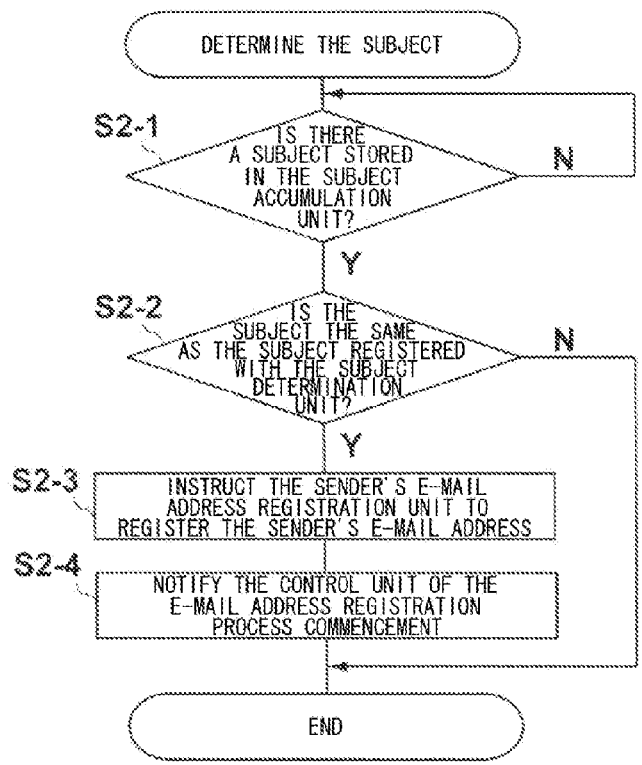
FIG. 5 is a flowchart showing the operation of a subject determination unit according to the first embodiment of this invention.

Referring back to FIG. 2, the subject determination unit 16 subsequently takes over the operation, and performs step S2, namely, the operation of the subject determination unit 16. Step S2 will be hereinafter described in details. FIG. 5 is the flowchart showing the operation of the subject determination unit according to the first embodiment of this invention In step S2-1, the subject determination unit 16 monitors the subject accumulation unit 15 to see if the subject is stored therein. Where the subject is detected therein, step S2-2 is proceeded to. The subject "MARR" should be detected in the e-mail shown in FIG. 3 in the example.

In step S2-2, the subject determination unit 16 determines whether the subject is the same as the subject previously stored in the subject determination unit 16. Where the subject is the same thereas, step S2-3 is proceeded to. Where not, this flow is terminated. In the example, suppose that the subject "MARR", which stands for "Mail Address Registration Requirement" meaning a request for e-mail address registration and serving as a first prescribed symbol, is previously stored in the subject determination unit 16. In such case, the subject "MARR" of the e-mail shown in FIG. 3 is the same as the previously stored subject "MARR", and therefore, step S2-3 is proceeded to.

In step S2-3, the subject determination unit 16 notifies the sender's e-mail address registration unit 18 of the registration instruction.

In step S2-4, the subject determination unit 16 further notifies the control unit 22 of the e-mail address registration process commencement, and terminates this flow.

Figure 6:
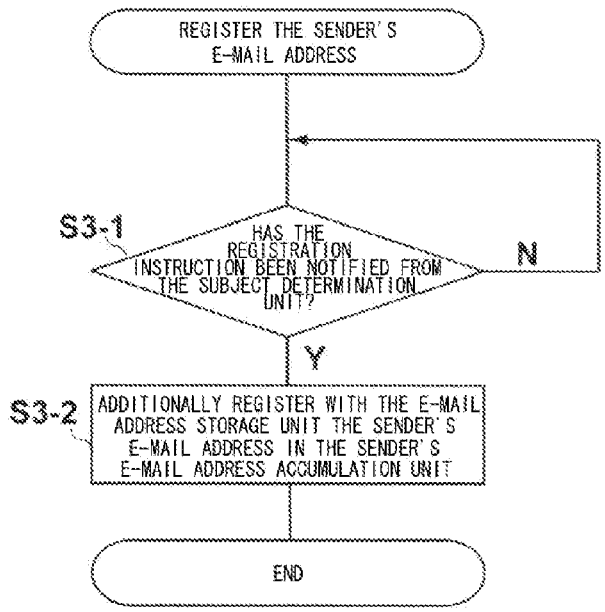
FIG. 6 is a flowchart showing the operation of a sender's e-mail address registration unit according to the first embodiment of this invention.

Referring back to FIG. 2, the sender's e-mail address registration unit 18 subsequently takes over the operation, and performs step S3, namely, the operation of the sender's e-mail address registration unit 18. Step S3 will be hereinafter described in details. FIG. 6 is the flowchart showing the operation of the sender's e-mail address registration unit according to the first embodiment of this invention.

In step S3-1, the sender's e-mail address registration unit 18 waits for receiving the registration instruction from the subject determination unit 16. Once receiving the registration instruction, step S3-2 is proceeded to.

In step S3-2, the sender's e-mail address registration unit 18 additionally registers the sender's e-mail address in the sender's e-mail address accumulation unit 14 with the e-mail address storage unit 17, and terminates this flow.

Figure 7:
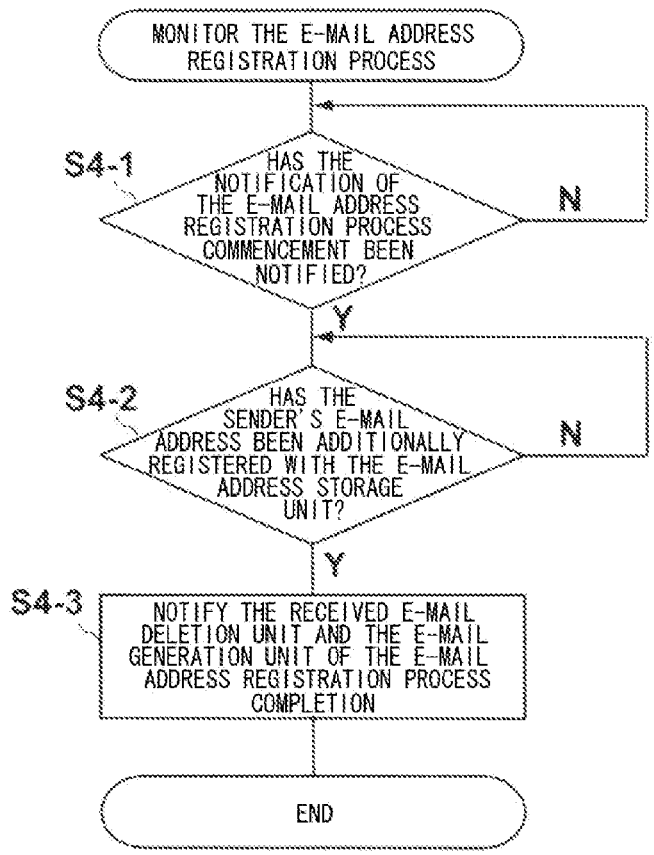
FIG. 7 is a flowchart showing the operation of a control unit monitoring an e-mail address registration process according to the first embodiment of this invention.

Referring back to FIG. 2, control unit 22 subsequently takes over the operation, and performs step S4, namely, the operation of the control unit 22 monitoring the e-mail address registration process, while the above-mentioned step S3 is performed. Step S4 will be hereinafter described. FIG. 7 is the flowchart showing the operation of the control unit monitoring the e-mail address registration process according to the first embodiment of this invention.

In step S4-1, the control unit 22 waits for receiving the notification of e-mail address registration process commencement from the subject determination unit 16, and proceeds to step S4-2 upon receiving the notification.

In step S4-2, upon receiving the notification, the control unit 22 stands by monitoring the status of the e-mail address storage unit 17. The control unit 22 proceeds to step S4-3 upon detecting the completion of the e-mail address registration process for registration with the e-mail address storage unit 17.

In step S4-3, the control unit 22 notifies the received e-mail deletion unit 21 and the e-mail generation unit 31 of the e-mail address registration process completion, meaning that the sender's e-mail address has been additionally reregistered with the e-mail address storage unit 17, and terminates this flow.

Figure 8:
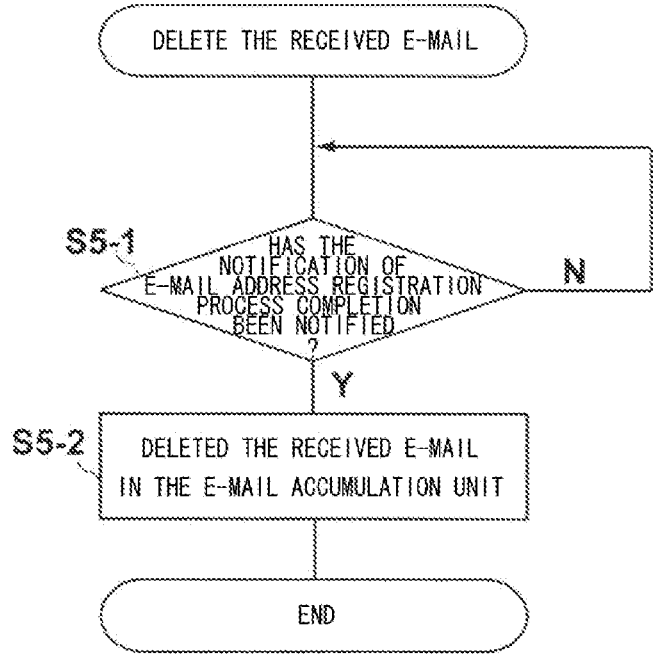
FIG. 8 is a flowchart showing the operation of a received e-mail deletion unit according to the first embodiment of this invention.

Referring back to FIG. 2, the received e-mail deletion unit subsequently takes over the operation, and performs step S5, namely, the operation of the received e-mail deletion unit 21. Step S5 will be hereinafter described in details. FIG. 8 is the flowchart showing the operation of the received e-mail deletion unit according to the first embodiment of this invention.

In step S5-1, the received e-mail deletion unit 21 waits for receiving the notification of e-mail address registration process completion from the control unit 22, and proceeds to step S5-2 upon receiving the notification.

In step S5-2, the received e-mail deletion unit 21 deletes the received e-mail stored in the e-mail accumulation unit 12, and terminates this flow.

Figure 9:
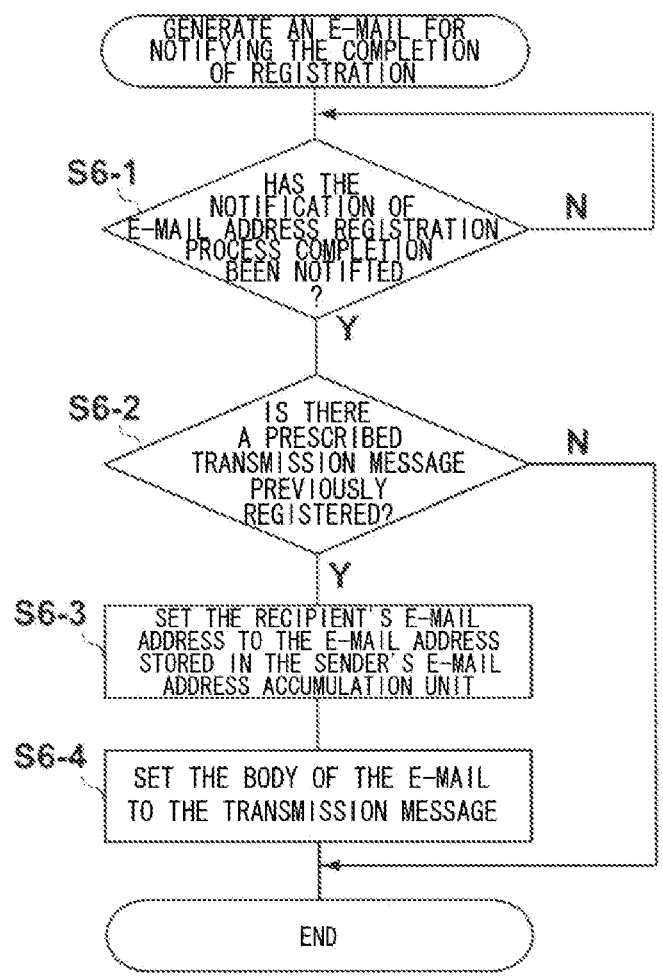
FIG. 9 is a flowchart showing the operation of an e-mail generation unit according to the first embodiment of this invention.

Referring back to FIG. 2, the e-mail generation unit 31 takes over the operation, and performs step S6, namely, the operation of the e-mail generation unit 31. Step S6 will be hereinafter described in details. FIG. 9 is the flowchart showing the operation of the e-mail generation unit according to the first embodiment of this invention.

In step S6-1, the e-mail generation unit 31 waits for receiving the notification of e-mail address registration process completion from the control unit 22, and proceeds to step S6-2 upon receiving the notification.

In step S6-2, the e-mail generation unit 31 determines whether a prescribed transmission message is previously registered with the e-mail generation unit 31. Where the prescribed transmission message is registered therewith, step S6-3 is proceeded to. Where not, this flow is terminated. For example, suppose that the transmission message "Mail Address Registration Process has finished", meaning that the e-mail address registration has been finished, is previously registered with the e-mail generation unit 31. In such case, step S6-3 is proceeded to.

In step S6-3, the e-mail generation unit 31 sets the recipient's e-mail address to the e-mail address stored in the sender's e-mail address accumulation unit 14.

In step S6-4, the e-mail generation unit 31 subsequently sets the body of the e-mail to the transmission message, and terminates this flow. In the example, the body of the e-mail is set to "Mail Address Registration Process has finished".

Figure 10:
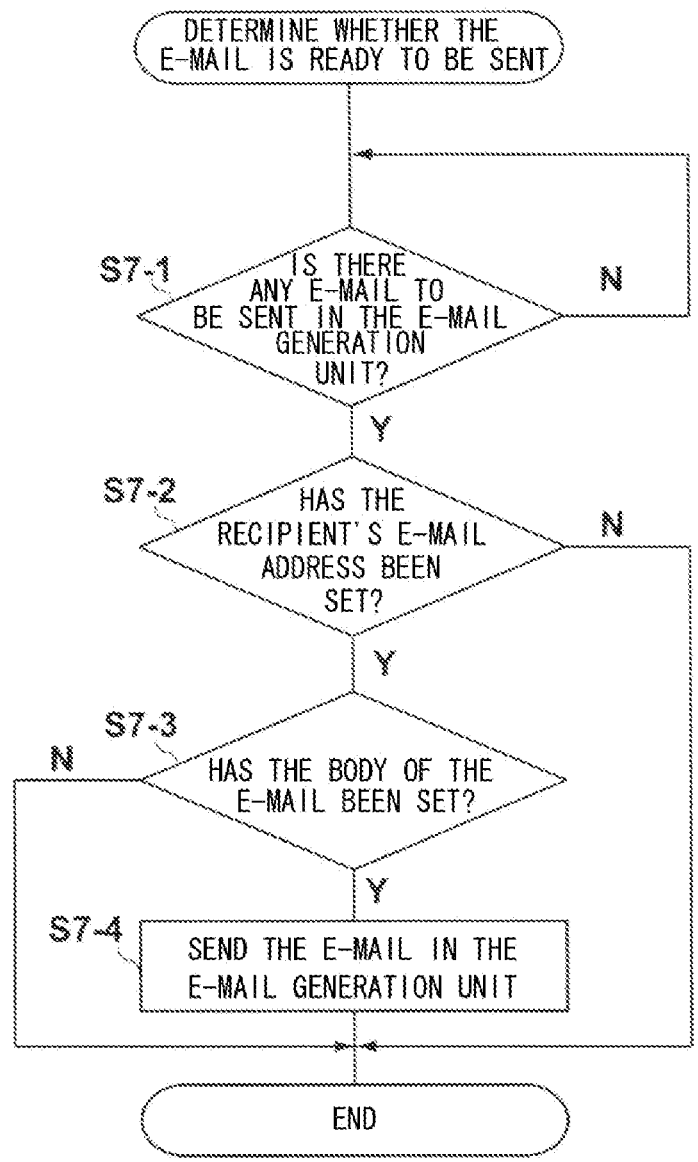
FIG. 10 is a flowchart showing the operation of an e-mail sender unit according to the first embodiment of this invention.

Referring back to FIG. 2, the e-mail sender unit 32 takes over the operation, and performs step S7, namely, the operation of the e-mail sender unit 32. Step S7 will be hereinafter described in details. FIG. 10 is the flowchart showing the operation of the e-mail sender unit according to the first embodiment of this invention.

In step S7-1, the e-mail sender unit 32 monitors the e-mail generation unit 31 to see if the e-mail to be sent is stored therein. Where the e-mail to be sent is stored therein, step S7-2 is proceeded to.

In step S7-2, the e-mail sender unit 32 determines whether the recipient's e-mail address has been set. Where the recipient's e-mail address has been set, step S7-3 is proceeded to. Where not, this flow is terminated.

In step S7-3, the e-mail sender unit 32 determines whether the body of the e-mail has been set. Where the body of the e-mail has been set, step S7-4 is proceeded to. Where not, this flow is terminated.

Figure 11:
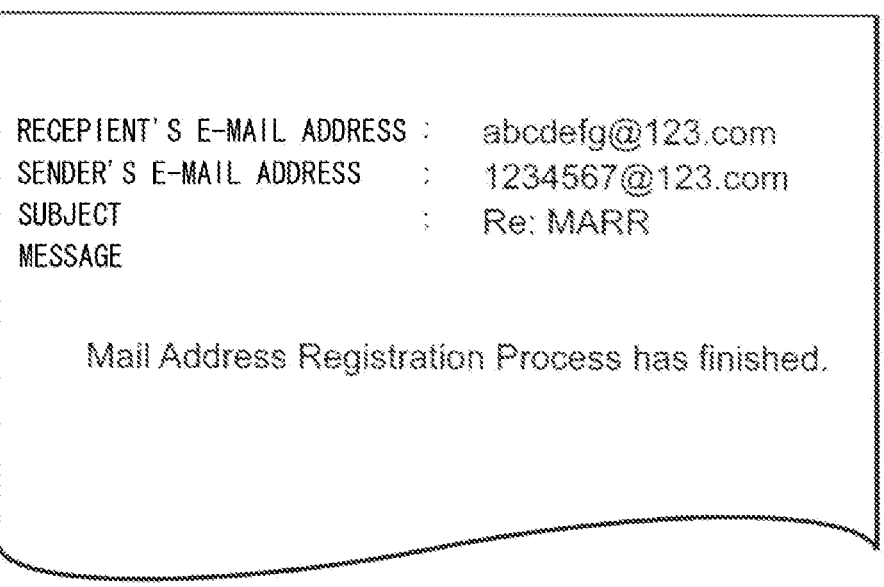
FIG. 11 is a conceptual diagram showing a registration completion notification e-mail.

In step S7-4, the e-mail sender unit 32 sends the e-mail in the e-mail generation unit 31 to the specified e-mail address. FIG. 11 is the conceptual diagram of the registration completion notification e-mail. More particularly, FIG. 11 is the conceptual diagram showing the e-mail, as the registration completion notification e-mail of registration with the e-mail address storage unit 17, to be sent from the e-mail sender unit 32 to the specified e-mail address. The e-mail in FIG. 11 has the recipient's e-mail address and the sender's e-mail address having been replaced with each other when compared to the e-mail in FIG. 3, and furthermore, the e-mail in FIG. 11 has the subject "Re: MARR" meaning the completion of registration and the body of the e-mail "Mail Address Registration Process has finished". "One-touch dial number" may also be added to the subject or the body of the e-mail so as to register the e-mail address with the specified one-touch dial number such as "03".

Accordingly, the multifunction device 100 according to the present embodiment enables the user to have his or her e-mail address automatically registered with the e-mail address storage unit 17 of the multifunction device 100 by sending the e-mail containing the subject "MARR" from the user's e-mail system to the multifunction device 100 where the user wants to register his or her e-mail address with the e-mail address storage unit of the multifunction device.

The multifunction device 100 according to the present embodiment of this invention stores in the e-mail address storage unit the sender's e-mail address of the received e-mail only if the subject of the received e-e-mail contains "MARR" (instruction information). A system administrator of the multifunction device is thus relieved from inquiring of each sender of received e-mails whether or not e-mail addresses thereof should be additionally registered when a large number of unnecessary e-mail messages, such as spam mails, are received. That is, the multifunction device 100 does not indiscriminately register sender's e-mail addresses of received e-mails.

In order to register the e-mail address with the multifunction device 100 according to the present embodiment of this invention, the multifunction device 100 has only to receive an e-mail containing the instruction information, such as "MARR", in the subject from the user who wants to register his or her e-mail address. Therefore, the user can register his or her e-mail address with the multifunction device 100 by sending a small size e-mail without relying on the body of the e-mail, and thus the multifunction device 100 alleviates the network load of network which e-mails for e-mail address registration pass through.

The multifunction device 100 according to the present embodiment of this invention deletes the received e-mail stored in the e-mail accumulation unit after completing the sender's e-mail address registration process. Consequently, the multifunction device 100 not only occupies smaller memory space for keeping received e-mails but also quickly goes into a status ready to receive further e-mails.

The multifunction device 100 according to the present embodiment of this invention sends the registration completion notification e-mail to the sender's e-mail address after completing the sender's e-mail address registration process. Consequently, the user is enabled to easily recognize that a series of registration process has been finished.

As hereinabove described, the multifunction device 100 according to the present embodiment of this invention registers the user's own e-mail address with the e-mail address storage unit thereof where the user sends the e-mail containing the instruction information in the subject to the multifunction device. Furthermore, the multifunction device 100 relieves the user from a cumbersome task of inputting a complicated e-mail address through pushing the operation buttons, character by character, in alphabet. Thus, the multifunction device 100 results in a highly convenient multifunction device with shorter registration time, simpler registration process, and less likely to make mistakes in inputting the e-mail address since the multifunction device 100 registers the user's e-mail address with the e-mail address storage unit thereof where the user sends the e-mail containing the instruction information in the subject to the multifunction device 100.

The Second Embodiment

Although not specifically shown in the first embodiment, e-mail addresses stored in the e-mail address storage unit 17 (FIG. 1) are displayed in the display unit 24 (FIG. 1) sorted in alphabetical order when the user requests to display an e-mail address list with the use of the operation unit 23 (FIG. 1) in the first embodiment. The user then selects an e-mail address that the e-mail is to be sent to from the displayed e-mail address list with the use of a scroll function of the operation buttons on the operation unit 23 (FIG. 1). With such e-mail address selection method, however, it may be troublesome for the user to specify the recipient's e-mail address. Especially where the user has registered e-mail addresses having a prefix of v or w, the more e-mail addresses are contained in the e-mail address list, it is the more likely that the user finds it troublesome to select an e-mail address.

The second embodiment is structured to display the latest registered e-mail address at the top of the display unit where e-mail addresses are requested to be displayed within less than the prescribed time after the e-mail address registration so that the e-mail address can be easily selected where the user wants to use the e-mail address right after its registration. On the other hand, e-mail addresses are displayed in ordinary alphabetical order where e-mail addresses are requested to be displayed not less the prescribed time after the e-mail address registration. The multifunction device according to the present embodiment is structured as follows to achieve the above mentioned purpose.

Figure 12:
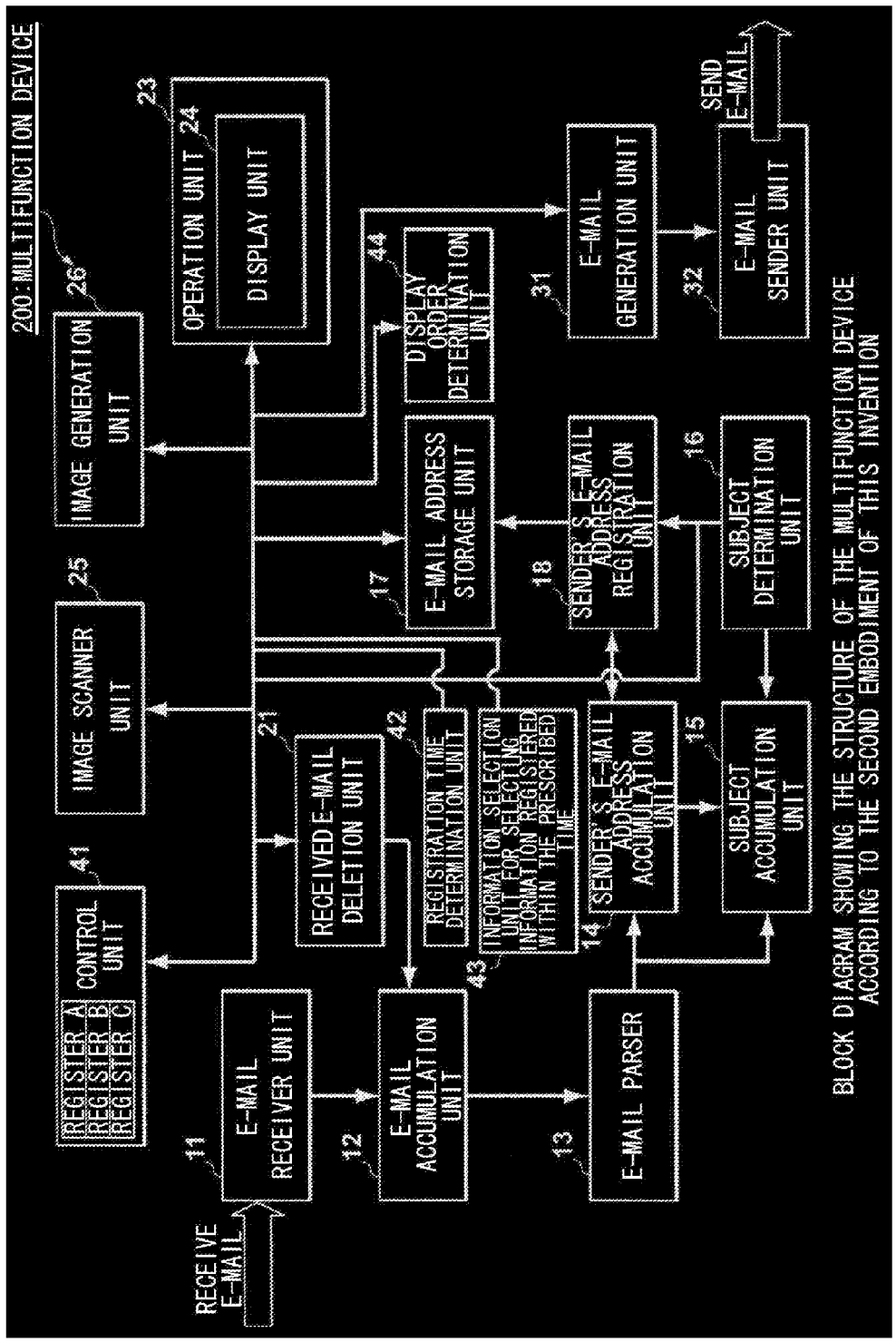
FIG. 12 is a block diagram showing a structure of the multifunction device according to the second embodiment of this invention.

FIG. 12 is the block diagram showing the structure of the multifunction device according to the second embodiment of this invention. A multifunction device 200 capable of sending and receiving e-mails as well as scanning and forming images is structured as shown in FIG. 12. As shown in FIG. 12, the multifunction device 200 includes a registration time determination unit 42, an information selection unit 43 for selecting information registered within the prescribed time, and a display order determination unit 44 in addition to those that the multifunction device 100 (FIG. 1) has. Furthermore, a register A, a register B, and a register C are arranged in a control unit 41, corresponding to the control unit 22 (FIG. 1) of the first embodiment. The other components are the same as the first embodiment except the above. Thus, only the components different from the first embodiment are hereinbelow described in details.

The control unit 41 controls the entire operation of the multifunction device 200, and particularly in the present embodiment, the control unit 41 includes the register A, the register B, and the register C in the interior of the control unit 41 in addition to functions of the control unit of the first embodiment. The register A keeps a time as to when the latest registered e-mail address was registered with the e-mail address storage unit 17. The register B keeps a current time. The register C keeps the prescribed time which the register C is set to. The control unit 41 performs a prescribed control program stored in a ROM, not shown, and initiates the registration time determination unit 42, the information selection unit 43, and the display order determination unit 44.

The registration time determination unit 41 determines the time as to when the e-mail address stored in the e-mail address storage unit 17 was registered. The information selection unit 43 determines (namely, selects the e-mail address) whether the e-mail address stored in the e-mail address storage unit 17 was registered within less than the prescribed time stored in the above mentioned register C before the current time kept in the register B. The display order determination unit 44 determines the order of the e-mail addresses stored in the e-mail address storage unit 17 based on prescribed rules as follows.

The prescribed rules are as follows. Rule 1: Where the registration time of the latest registered e-mail address stored in the e-mail address storage unit 17 is within less than the prescribed time stored in the register C before the current time, the latest registered e-mail address is put at the top, and the rest of e-mail addresses are sorted in alphabetical order. Rule 2: Where the registration time of the latest registered e-mail address stored in the e-mail address storage unit 17 is not less than the prescribed time stored in the register C before the current time, all the e-mail addresses are sorted in alphabetical order.

The display order determination unit 44 will be hereinafter described with reference to the figures. FIG. 13 is the diagram for explaining the function of the display order determination unit. TABLE A shows the e-mail address storage unit 17 (FIG. 12) displayed on the display unit 24 (FIG. 12) as they are. TABLE B shows the e-mail address storage unit 17 (FIG. 12) after a sort is performed based on the Rule 1 of the prescribed rules. TABLE C shows the e-mail address storage unit 17 after a sort is performed based on the Rule 2 of the prescribed rules. In TABLE B and TABLE C, an e-mail address in an elongated circle is the latest registered e-mail address.

As shown in TABLE A, the e-mail address list is displayed in alphabetical order regardless of the registration time of e-mail address where the e-mail addresses stored in the e-mail address storage unit 17 (FIG. 12) are displayed on the display unit 24 (FIG. 12) as they are. As shown in TABLE B, where the latest registered e-mail address in the elongated circle was registered within less than the prescribed time stored in the register C before the current time, the latest registered e-mail address is displayed at the top and the rest of e-mail addresses are displayed in alphabetical order. As shown in TABLE C, where the latest registered e-mail address in the elongated circle was registered not less than the prescribed time stored in the register C before the current time, all of the e-mail addresses are displayed in alphabetical order.

The operation of the multifunction device according to the second embodiment will be hereinafter described. The multifunction device 200 according to the present embodiment is capable of sending and receiving e-mails as well as scanning and forming images. The registration of the sender's e-mail address of the received e-mail, the deletion of the received e-mail from the accumulation unit, and the transmission of the e-mail address registration completion notification e-mail to the sender's e-mail address are the same as those of the first embodiment, and thus are omitted for brevity.

Figure 14:
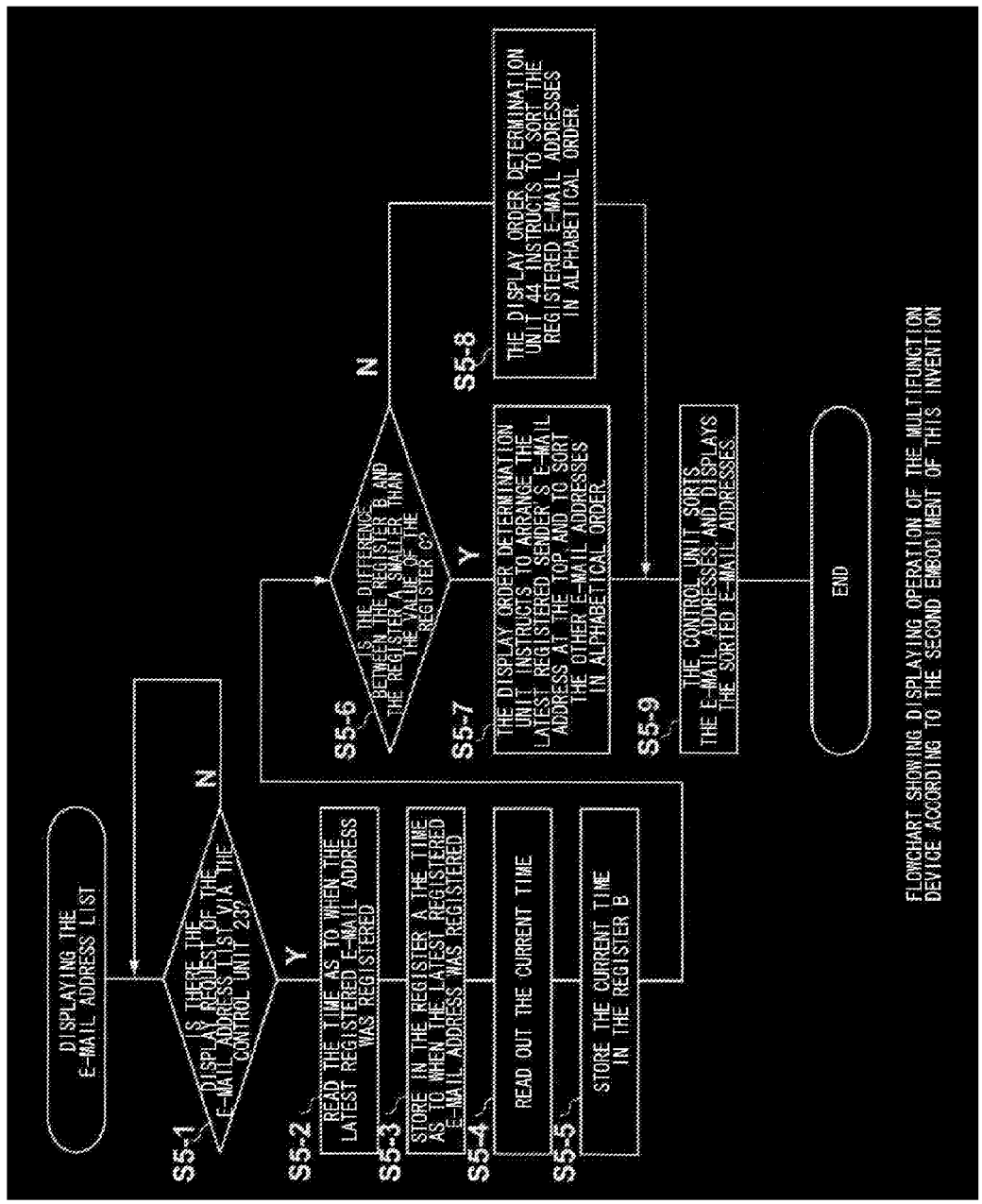
FIG. 14 is a flowchart showing a displaying operation of the multifunction device according to the second embodiment of this invention.

FIG. 14 is the flowchart showing the displaying operation of the multifunction device according to the second embodiment of this invention. The displaying operation of the multifunction device 200, including the operations of the registration time determination unit 42, the information selection unit 43, and the display order determination unit 44, which are initiated and generated by the control unit 41, will be described from step S5-1 to S5-9 in the order of steps with reference to the FIG. 12.

In step S5-1, the control unit 41, upon detecting the completion of the e-mail address registration process with the e-mail address storage unit 17, waits for the display request of the e-mail address list from the user via the control unit 23, and proceeds to step S5-2 upon receiving the display request.

In step S5-2, the registration time determination unit 42 reads and sends to the control unit 41 the time as to when the latest registered e-mail address was registered with the e-mail address storage unit 17.

In step S5-3, the control unit 41 receives from the registration time determination unit 42 the time as to when the latest registered e-mail address was registered, and stores the registration time in the register A.

In step S5-4, the control unit 41 reads out the current time from a clock in the control unit 41.

In step S5-5, the control unit 41 stores the current time in the register B.

In step S5-6, the information selection unit 43 determines whether the latest registered e-mail address was registered within less than the prescribed time, such as within less than 30 minutes, before the current time. Where the latest registered e-mail address was registered within less than the prescribed time, step S5-7 is proceeded to. Where the latest registered e-mail address was registered not less than the prescribed time, step S5-8 is proceeded to. That is, the difference between the register B and the register A is compared with the register C. In the example, if the difference between the register B and the register A is 15 minutes, step S5-7 is proceeded to. If the difference is 45 minutes, step S5-8 is proceeded to.

In step S5-7, the display order determination unit 44 determines to arrange the latest registered sender's e-mail address at the top of the e-mail address storage unit 17, and sort the remaining e-mail addresses in alphabetical order.

On the other hand, in step S5-8, the display order determination unit 44 determines to sort all the registered e-mail addresses in alphabetical order.

In step S5-9, the control unit 41 sorts the e-mail addresses in the e-mail address storage unit 17 based on the decision of the display order determination unit 44, and sends the sorted e-mail addresses to the display unit 24 to have the display unit 24 display the sorted e-mail addresses, and then terminates this flow. The result of the sorted e-mail addresses is shown in FIG. 13.

In the above example, although only a single latest registered e-mail address is arranged to be displayed at the top of the list, it may also be configured to display at the top of the list a plurality of all the e-mail addresses that have been newly registered within less than a certain time such as, e.g., 30 minutes before the display request upon searching for such newly registered e-mail addresses. Such configuration may be effective for a multifunction peripheral (MFP) used in a large office.

As hereinabove described, the multifunction device according to the present embodiment displays the latest registered e-mail address at the top when operated to display the e-mail addresses right after the e-mail address registration, and thus, the user who wants to select the e-mail address right after the user has registered the e-mail address is relieved from a cumbersome task of searching for the e-mail address by pressing the operation buttons previously equipped with the multifunction device. Therefore, the user can register and use the e-mail address in a simple process in a shorter time as well as avoid making mistakes in inputting e-mail addresses. Thus, the present embodiment provides a highly convenient multifunction device.

The Third Embodiment

In the first embodiment, the user sends the e-mail containing the subject "MARR" from the user's e-mail system to the multifunction device 100 (FIG. 1) so that the user's e-mail address is automatically additionally registered with the e-mail address storage unit 17 (FIG. 1) where the user wants to register his or her e-mail address in the e-mail address storage unit 17 (FIG. 1). In an actual situation in which the multifunction device is used, the user may want to delete the registration of e-mail address which was once registered. Taking such situation into account, the present embodiment has an e-mail address registration deletion function in addition to the functions of the multifunction device of the first embodiment. To achieve such purpose, the multifunction device according to the third embodiment is structured as follows.

Figure 15:
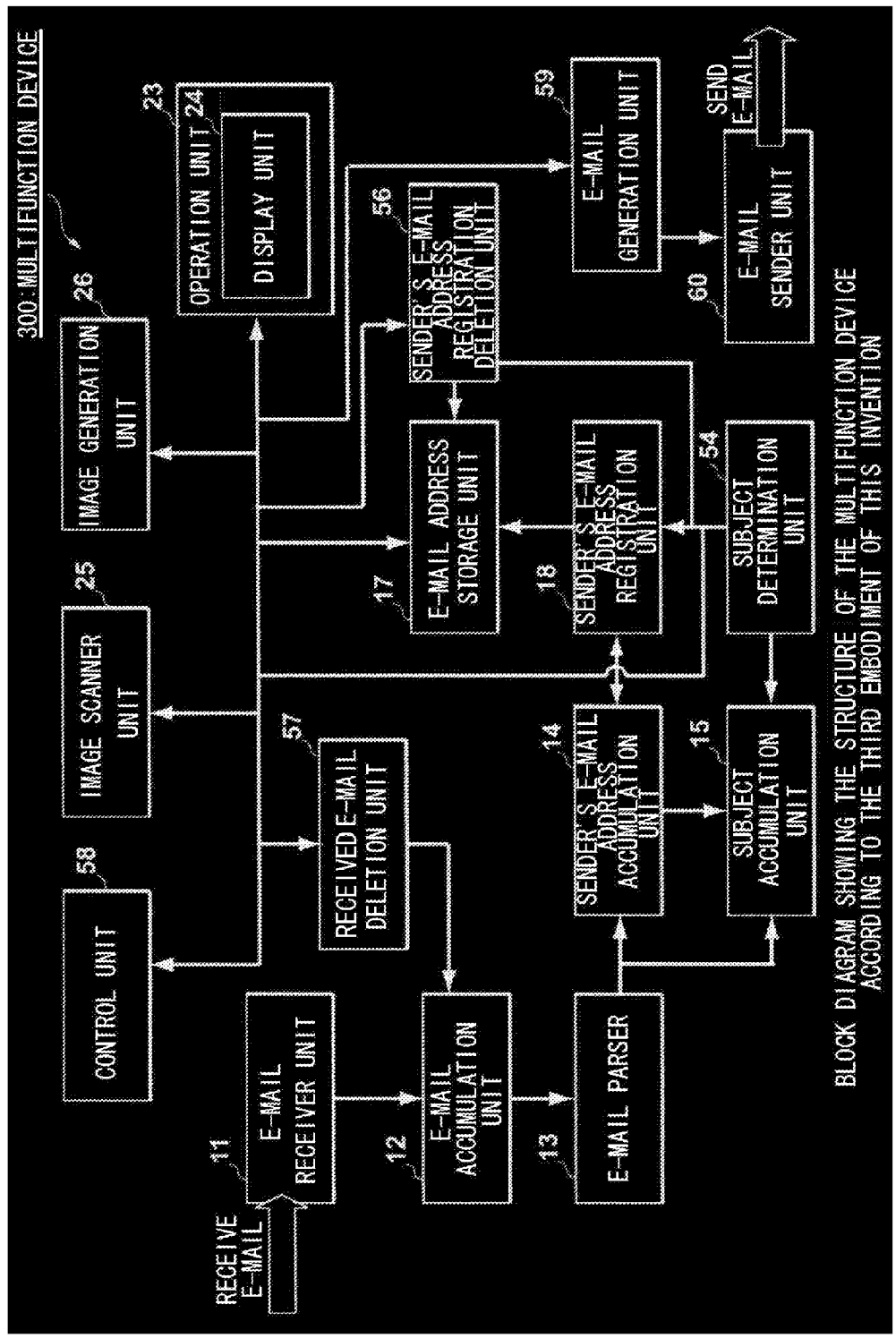
FIG. 15 is a block diagram showing a structure of the multifunction device according to the third embodiment of this invention.

FIG. 15 is the block diagram showing the structure of the multifunction device according to the third embodiment of this invention. A multifunction device 300 capable of sending and receiving e-mails as well as scanning and forming images is structured as shown in FIG. 15. Only functions of the multifunction device 300 which are added or different from the first embodiment will be hereinafter described. Components having the same functions as the first embodiment are denoted by the same reference numerals as the first embodiment, and the description thereof is omitted for brevity.

Referring to FIG. 15, the subject determination unit 54 determines whether the subject extracted by the e-mail parser 13 is the same as the subjects contained in the subject determination unit 54. Where the subject is the same thereas, the subject determination unit 54 gives the registration instruction to the sender's e-mail address registration unit 18, or a registration deletion instruction (newly added in the third embodiment) to a sender's e-mail address registration deletion unit 56. The sender's e-mail address registration deletion unit 56 deletes (newly added in the third embodiment) the registration of the sender's e-mail address from the e-mail address storage unit 17 upon receiving the notification of registration deletion instruction (newly added in the third embodiment) from the subject determination unit 54. A received e-mail deletion unit 57 deletes the received e-mail stored from the e-mail accumulation unit 12 upon receiving the notification of e-mail address registration process completion, as will be described below, or a notification of e-mail address registration deletion process completion (newly added in the third embodiment), as will be described below.

A control unit 58 controls the entire operation of the multifunction device. The control unit 58 monitors the e-mail address storage unit 17 upon receiving the notification of e-mail address registration process commencement from the subject determination unit 54. The control unit 58, upon finding that the sender's e-mail address has been registered with the e-mail address storage unit 17, notifies the received e-mail deletion unit 57 and an e-mail generation unit 59 of the e-mail address registration process completion. Furthermore, the control unit 58 monitors the e-mail address storage unit 17 upon receiving the notification of e-mail address registration deletion process commencement (newly added in the third embodiment) from the subject determination unit 54. The control unit 58, upon detecting that the sender's e-mail address has been deleted from the e-mail address storage unit 17, notifies the received e-mail deletion unit 57 and the e-mail generation unit 59 of the e-mail address registration deletion process completion (newly added in the third embodiment).

The e-mail generation unit 59 generates an e-mail. The e-mail generation unit 59, upon receiving the notification of e-mail address registration process completion, generates the e-mail to be sent to the e-mail address registered in the e-mail address registration process with an attached message for the purpose of notifying the e-mail address registration completion. Furthermore, the e-mail generation unit 59, upon receiving the notification of e-mail address registration deletion process completion, generates the e-mail to be sent to the e-mail address whose registration has been deleted by the e-mail address registration deletion process with an attached message for the purpose of notifying the e-mail address registration deletion completion.

Figure 16:
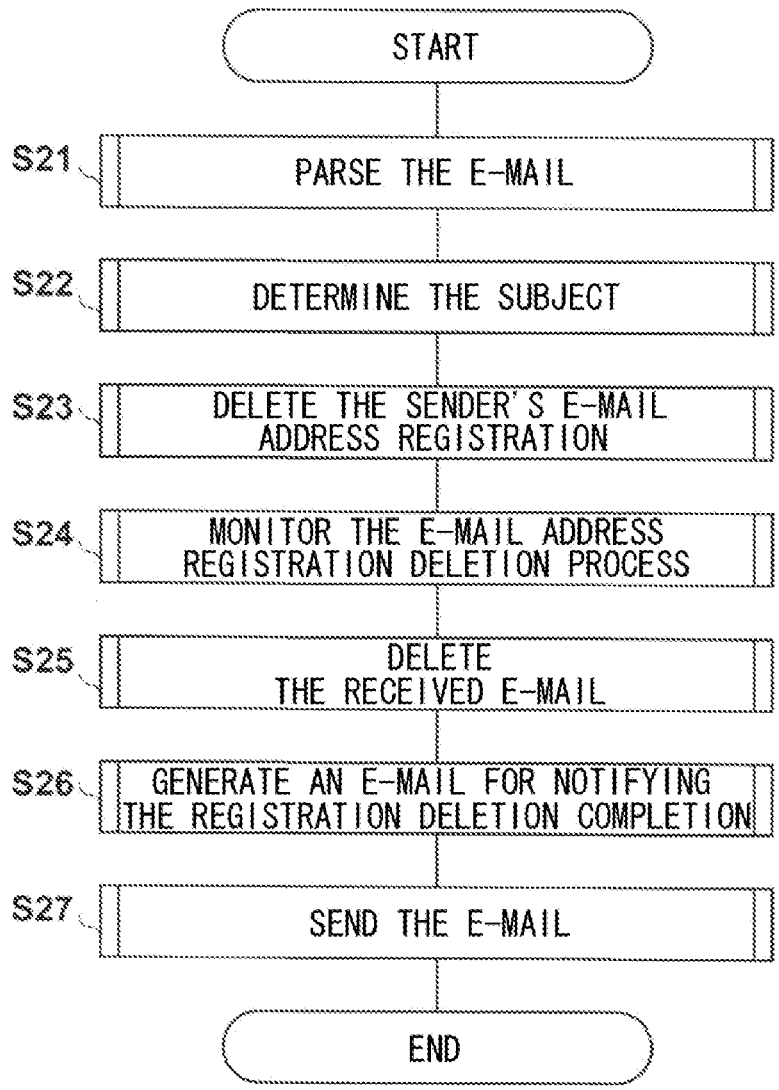
FIG. 16 is a block diagram showing an overall operation of the multifunction device according to the third embodiment of this invention.
Figure 17:
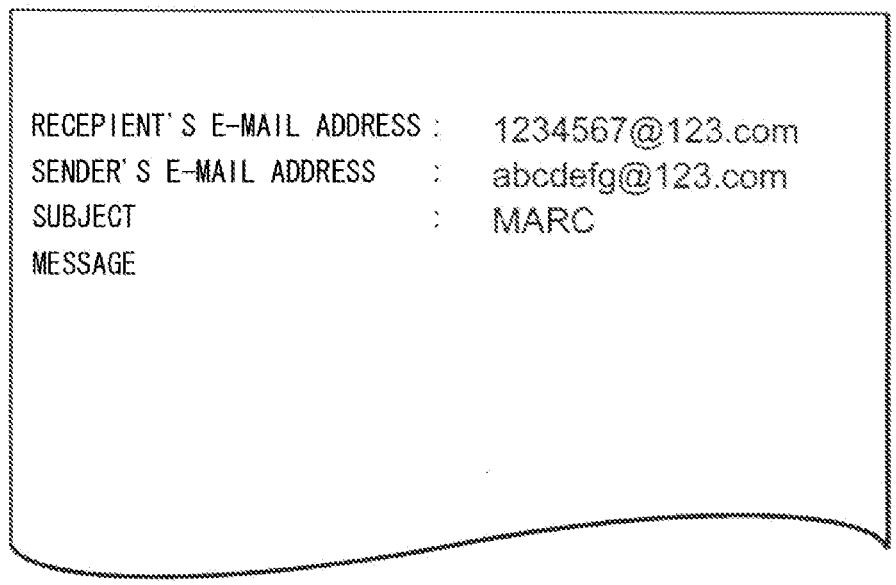
FIG. 17 is a conceptual diagram showing an e-mail received externally in the third embodiment of this invention.

The multifunction device 300 according to the present embodiment of this invention will be hereinafter described. FIG. 16 is the block diagram showing the overall operation of the multifunction device according to the third embodiment of this invention. Step S21 trough step S27 will be described in details in the order of steps with reference to FIG. 16. Please note that although the multifunction device 300 according to the present embodiment can perform the e-mail address registration just as the multifunction device 100 according to the first embodiment, the e-mail address registration process is omitted from the below description to avoid redundancy, and the below description will be focused on the e-mail address registration deletion process. FIG. 17 is the conceptual diagram showing the e-mail received externally in the third embodiment of this invention.

As shown in FIG. 16, the multifunction device 300 according to the present embodiment receives the e-mail shown in FIG. 17 from an external apparatus, not shown, via the e-mail receiver unit 11. The received e-mail is stored in the e-mail accumulation unit 12. The received e-mail can be displayed on the display unit 24 and printed by the image forming unit 26 upon the operation of the operation unit 23. In such occasion, the received e-mail is transferred to the e-mail parser 13, and step S21, namely, the operation of the e-mail parser 13, is performed. The operation of step S21 is omitted from the description as being the same as step S1, namely, step S1-1 through step S1-5, which has already been described in the first embodiment.

Figure 18:
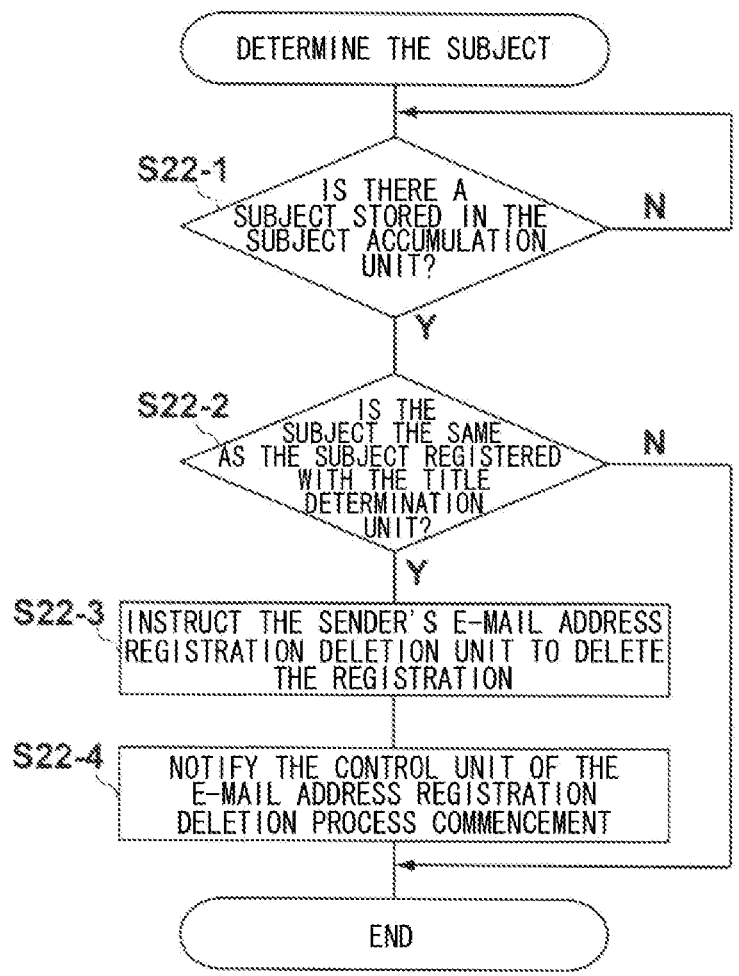
FIG. 18 is a flowchart showing the operation of the subject determination unit according to the third embodiment of this invention.

Referring back to FIG. 16, the subject determination unit 54 takes over the operation, and performs step S22, namely, the operation of the subject determination unit 54. Step S22 will be describe in details. FIG. 18 is the flowchart showing the operation of the subject determination unit according to the third embodiment of this invention.

In step S22-1, the subject determination unit 54 monitors the subject accumulation unit 15 to see if the subject is stored therein. The subject determination unit 54 proceeds to step S22-2 upon detecting the subject stored therein. In the example of FIG. 17, the subject "MARC" should be detected.

In step S22-2, the subject determination unit 54 determines whether the subject is the same as the subject previously registered with the subject determination unit 54. Where the subject is the same thereas, step S22-3 is proceeded to. Where not, this flow is terminated. In the example, suppose that the subject "MARC", which stands for "Mail Address Registration Clear" meaning a request for e-mail address registration deletion and serving as a second prescribed symbol, is previously stored in the subject determination unit 54. In such case, the subject "MARC" of the e-mail shown in FIG. 17 is the same as the previously stored subject "MARC", and therefore, step S22-3 is proceeded to.

In step S22-3, the subject determination unit 54 notifies the sender's e-mail address registration deletion unit 56 of the registration deletion instruction.

In step S22-4, the subject determination unit 54 notifies the control unit 58 of the e-mail address registration deletion process commencement meaning that the process has started to delete the registration of the sender's e-mail address from the e-mail address storage unit 17, and terminates this flow.

Figure 19:
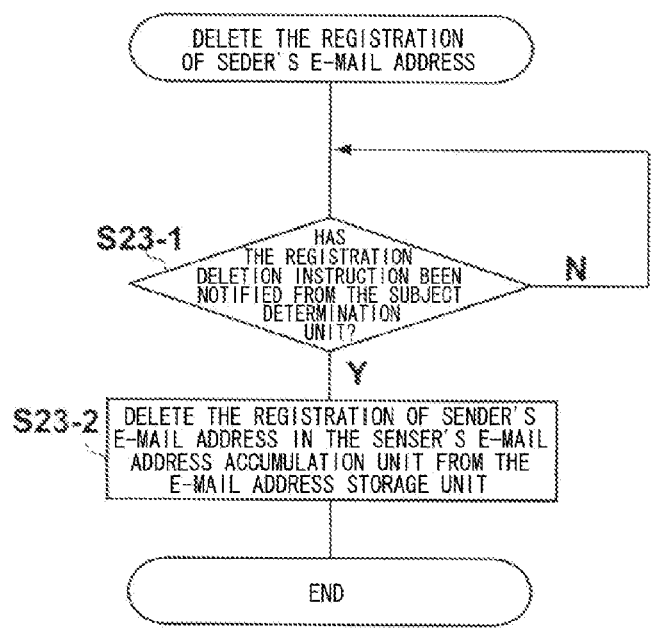
FIG. 19 is a flowchart showing the operation of a sender's e-mail address registration deletion unit according to the third embodiment of this invention.

Referring back to FIG. 16, the sender's e-mail address registration deletion unit 56 takes over the operation, and performs step S23, namely, the operation of the sender's e-mail address registration deletion unit 56. Step 23 will be described in details. FIG. 19 is the flowchart showing the operation of the sender's e-mail address registration deletion unit according to the third embodiment of this invention.

In step S23-1, the sender's e-mail address registration deletion unit 56 waits for receiving the registration deletion instruction from the subject determination unit 54, and proceeds to step S23-2 upon receiving the registration deletion instruction.

In step S23-2, the sender's e-mail address registration deletion unit 56 deletes the registration of the e-mail address stored in the sender's e-mail address accumulation unit 14 from the e-mail address storage unit 17, and terminates this flow.

Figure 20:
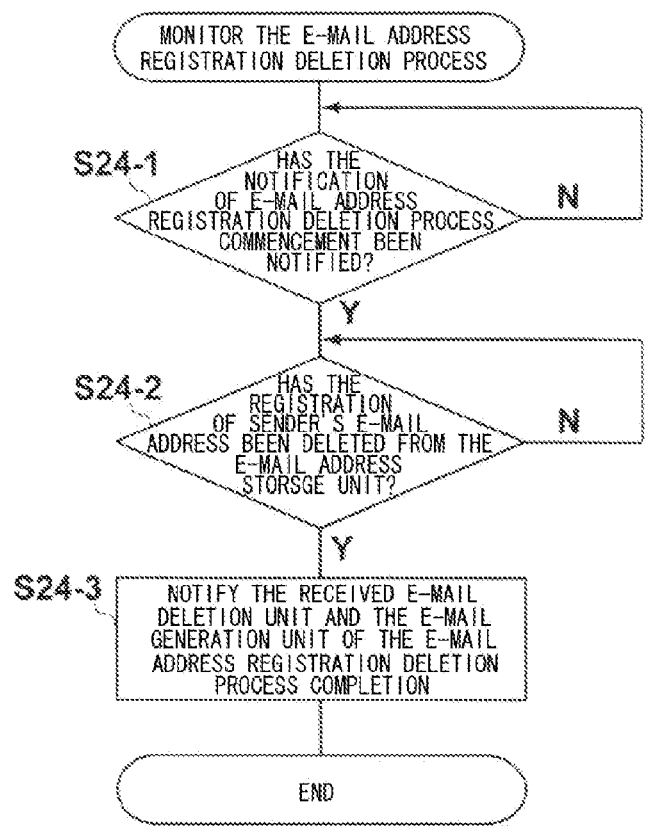
FIG. 20 is a flowchart showing the operation of the control unit monitoring an e-mail address registration deletion process according to the third embodiment of this invention.

Referring back to FIG. 16, the control unit 58 takes over the operation. The step S24, namely, the operation of the control unit 58 monitoring the e-mail address registration deletion process, is performed while the above described step S23 is performed. Step S24 will be hereinafter described in details. FIG. 20 is the flowchart showing the operation of the control unit monitoring the e-mail address registration deletion process according to the third embodiment of this invention.

In step S24-1, the control unit 58 waits for receiving the notification of e-mail address registration deletion process commencement from the subject determination unit 54, and proceeds to step S24-2 upon receiving the notification.

In step S24-2, the control unit 58, upon receiving the notification, stands by monitoring the status of the e-mail address storage unit 17. The control unit 58 proceeds to step S24-3 upon detecting the completion of e-mail address registration deletion process for deletion from the e-mail address storage unit 17.

In step S24-3, the control unit 58 notifies the received e-mail deletion unit 57 and the e-mail generation unit 59 of the notification of e-mail address registration deletion process completion meaning that the registration of the sender's e-mail address has been deleted from the e-mail address storage unit 17, and terminates this flow.

Figure 21:
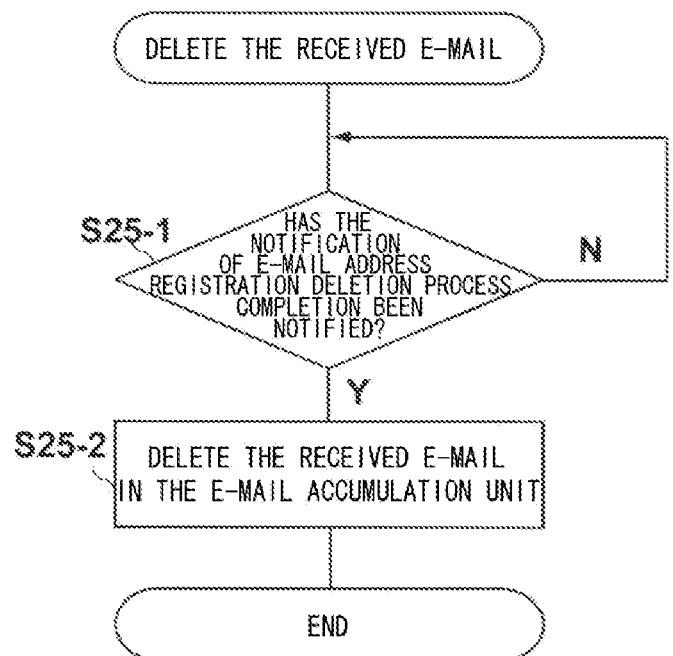
FIG. 21 is a flowchart showing the operation of the received e-mail deletion unit according to the third embodiment of this invention.

Referring back to FIG. 16, the received e-mail deletion unit 57 takes over the operation, and performs step S25, namely, the process of the received e-mail deletion unit 57. Step S25 will be hereinafter described in details. FIG. 21 is the flowchart showing the operation of the received e-mail deletion unit according to the third embodiment of this invention.

In step S25-1, the received e-mail deletion unit 57 waits for receiving the notification of e-mail address registration deletion process completion from the control unit 58, and proceeds to step S25-2 upon receiving the notification.

In step S25-2, the received e-mail deletion unit 57 deletes the received e-mail stored in the e-mail accumulation unit 12, and terminates this flow.

Figure 22:
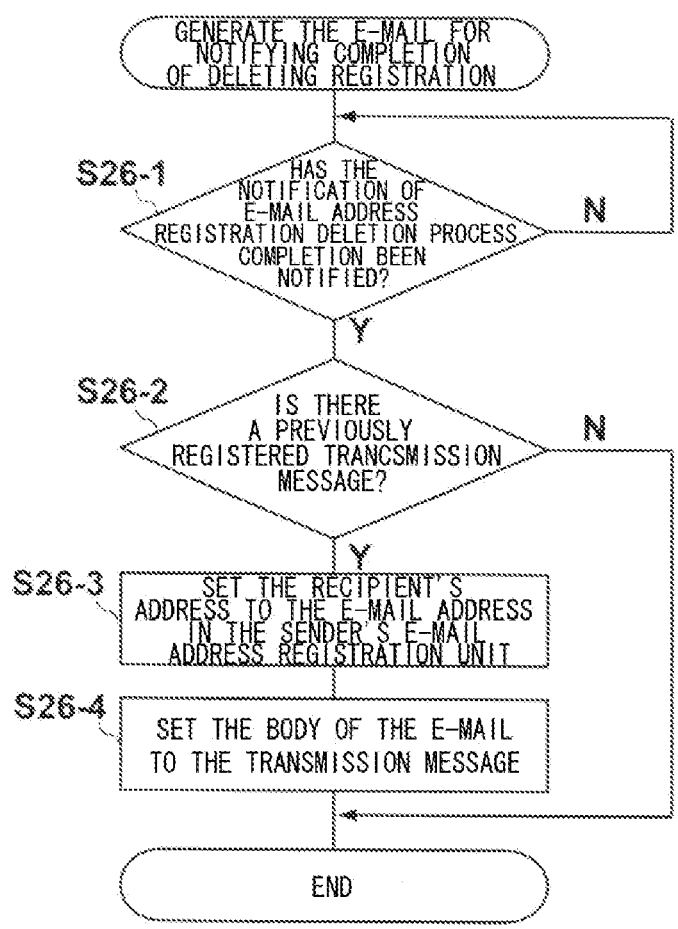
FIG. 22 is a flowchart showing the operation of the e-mail generation unit according to the third embodiment of this invention.

Referring back to FIG. 16, the e-mail generation unit 59 takes over the operation, and performs step S26, namely, the operation of the e-mail generation unit 59. Step S26 will be hereinafter described in details. FIG. 22 is the flowchart showing the operation of the e-mail generation unit 59 according to the third embodiment of this invention.

In step S26-1, the e-mail generation unit 59 waits for receiving the notification of e-mail address registration deletion process completion, and proceeds to step S26-2 upon receiving the notification.

In step S26-2, the e-mail generation unit 59 determines whether a prescribed transmission message is registered with the e-mail generation unit 59. Where the prescribed transmission message is registered therewith, step S26-3 is proceeded to. Where not, this flow is terminated. For example, suppose that the transmission message, "Mail Address Clear Process has finished" meaning the completion of e-mail address registration deletion, is previously registered with the e-mail generation unit 59. In such case, step S26-3 is proceeded to.

In step S26-3, the e-mail generation unit 59 sets the recipient's e-mail address of the e-mail to the e-mail address stored in the sender's e-mail address accumulation unit 14.

In step S26-4, the e-mail generation unit 59 subsequently sets the body of the e-mail to the transmission message, and terminates this flow. In the example, the body of the e-mail is set to "Mail Address Clear Process has finished".

Figure 23:
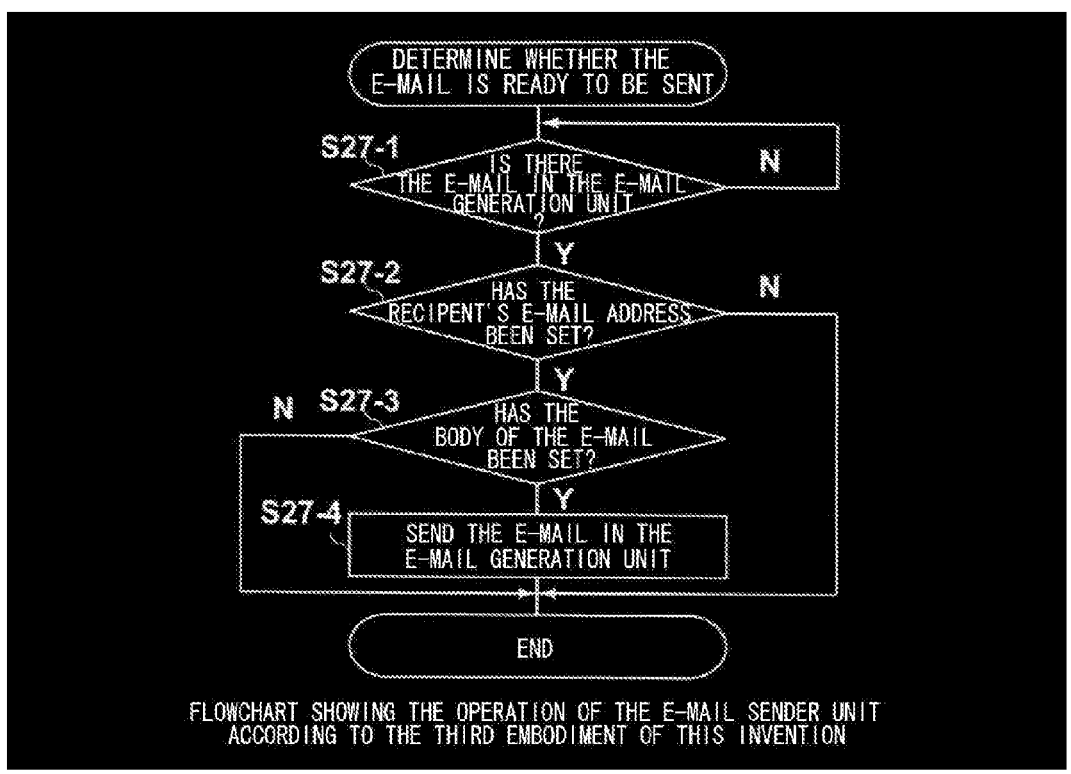
FIG. 23 is a flowchart showing the operation of the e-mail sender unit according to the third embodiment of this invention.

Referring back to FIG. 16, the e-mail sender unit 60 takes over the operation, and performs step S27, namely, the process of e-mail sender unit 60. Step S27 will be hereinafter described in details. FIG. 23 is the flowchart showing the operation of the e-mail sender unit according to the third embodiment of this invention.

In step S27-1, the e-mail sender unit 60 monitors the e-mail generation unit 59 to see if the e-mail to be sent is contained therein. Where the e-mail to be sent is contained therein, the e-mail sender unit 60 proceeds to step S27-2.

In step S27-2, the e-mail sender unit 60 determines whether the recipient's e-mail address has been set. Where the recipient's e-mail address has been set, the e-mail sender unit 60 proceeds to step S27-3. Where the recipient's e-mail address has not been set, the e-mail sender unit 60 terminates this flow.

In step S27-3, the e-mail sender unit 60 determines whether the body of the e-mail has been set. Where the body of the e-mail has been set, the e-mail sender unit 60 proceeds to step S27-4. Where not, the e-mail sender unit 60 terminates this flow.

Figure 24:
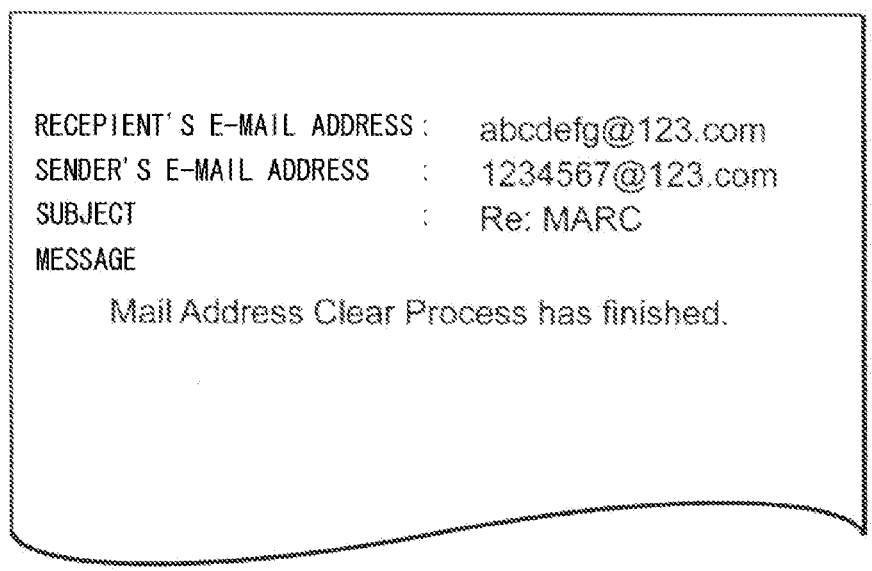
FIG. 24 is a conceptual diagram showing the registration deletion completion notification e-mail in the third embodiment of this invention.

In step S27-4, the e-mail sender unit 60 sends the e-mail in the e-mail generation unit 59 to the specified recipient's address. FIG. 24 is the conceptual diagram showing the registration deletion completion notification e-mail in the third embodiment of this invention. FIG. 24 shows the conceptual diagram showing the e-mail, as the registration deletion completion notification e-mail of deletion of registration from the e-mail address storage unit 17, to be sent to the recipient's e-mail address specified by the e-mail sender unit 60. The e-mail in FIG. 24 has the recipient's e-mail address and the sender's e-mail address having been replaced with each other when compared to the received e-mail in FIG. 17, and furthermore, the e-mail in FIG. 24 has the subject "Re: MARC" meaning the completion of registration deletion and the body "Mail Address Clear Process has finished". "One-touch dial number" may also be added to the subject or the body of the e-mail so as to delete the registration of the specified one-touch dial number such as "03".

Accordingly, the multifunction device according to the present embodiment enables the user to have the registration of his or her e-mail address deleted from the e-mail address storage unit of the multifunction device by sending the e-mail containing the instruction information in the subject, which is different from that of the first embodiment, to the multifunction device according to the present embodiment. That is, the user can delete his or her e-mail address registered with the multifunction device upon sending an e-mail to the multifunction device. Thus, the user is relieved from the cumbersome task of deleting the registration of e-mail address by pushing the operation buttons provided with the multifunction device. Therefore, the multifunction device according to the present embodiment enables e-mail address deletion in a shorter time and with a simple method, and a highly convenient multifunction device is thus provided.

The Fourth Embodiment

In the first embodiment described above, the multifunction device 100 is made to automatically register the user's e-mail address with the e-mail address storage unit 17 (FIG. 1) of the multifunction device 100 (FIG. 1) upon receiving the e-mail containing the subject "MARR" sent from the user's e-mail system to the multifunction device 100 (FIG. 1) where the user wants to have his or her e-mail address registered with the e-mail address storage unit 17 (FIG. 1) of the multifunction device 100 (FIG. 1). Furthermore, the multifunction device 300 is made to automatically delete the registration of the user's e-mail address from the e-mail address storage unit 17 (FIG. 15) of the multifunction device 300 (FIG. 15) upon receiving the e-mail containing the subject "MARC" sent from the user's e-mail system to the multifunction device 300 (FIG. 1) where the user wants to delete the registration of his or her e-mail address, previously registered with the e-mail address storage unit 17 (FIG. 15), from the e-mail address storage unit 17 (FIG. 15). In the fourth embodiment, the multifunction device is enabled to print out the e-mail address list of e-mail addresses previously stored in the e-mail address storage unit 17 so that the user can review the e-mail address list prior to the registration (described in the first embodiment) or the deletion of registration. Such multifunction device according to the fourth embodiment of this invention is structured as follows.

Figure 25:
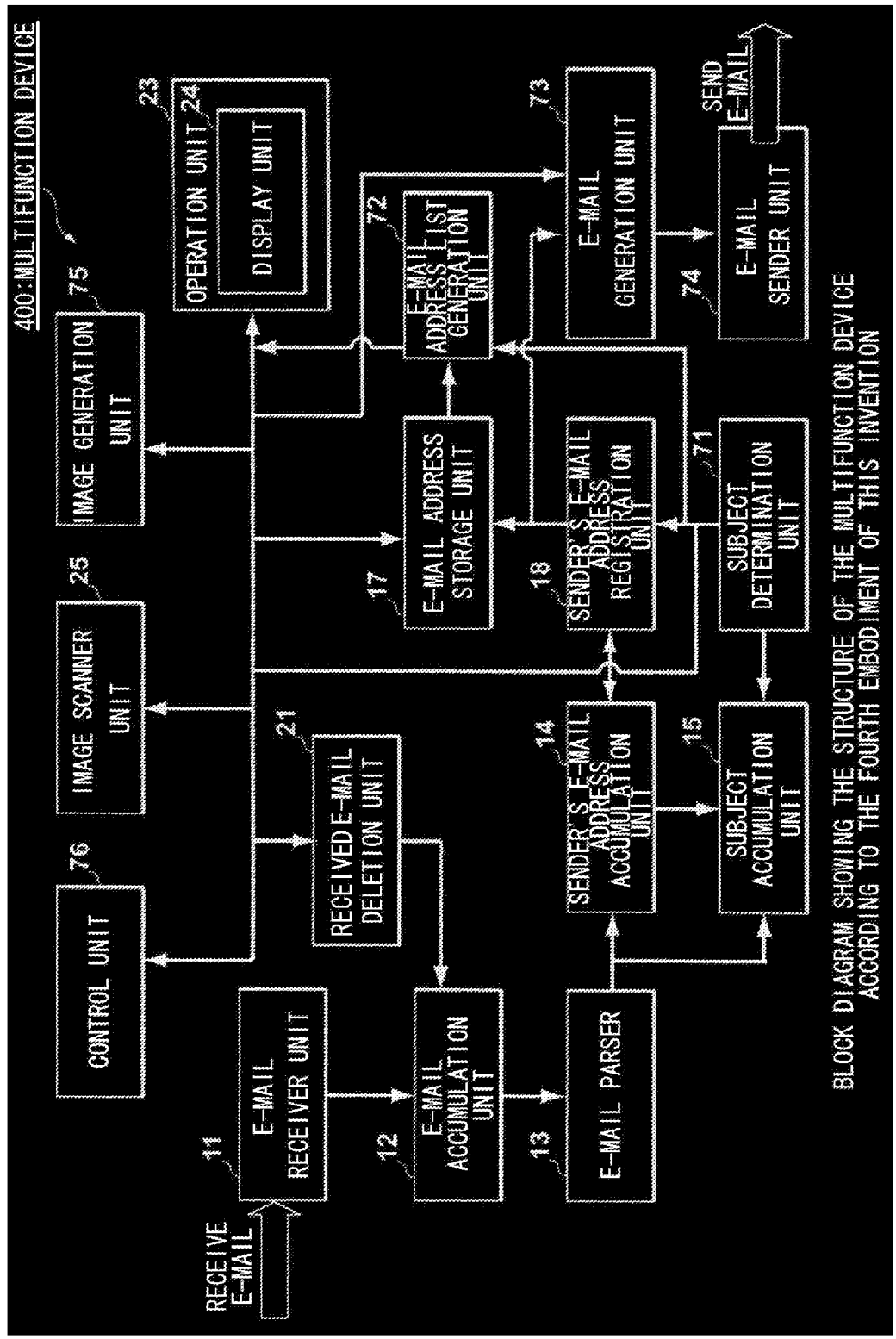
FIG. 25 is a block diagram showing a structure of the multifunction device according to the fourth embodiment of this invention.

FIG. 25 is the block diagram showing the structure of the multifunction device according to the fourth embodiment of this invention. A multifunction device 400 capable of sending and receiving e-mails as well as scanning and forming images is structured as shown in FIG. 25. Only functions of the multifunction device 400 which are added or different from the first embodiment will be hereinafter described. Components having the same functions as the first embodiment are denoted by the same reference numerals as the first embodiment, and the description thereof is omitted for brevity.

In FIG. 25, a subject determination unit 71 determines whether the subject extracted by the e-mail parser 13 is the same as the subject previously registered with the subject determination unit 71. Where the subject extracted is the same thereas, the subject determination unit 71 gives the registration instruction to the sender's e-mail address registration unit 18. For example, suppose that the subject extracted is "MALP" which stands for "Mail Address List Print". In such case, the subject determination unit 71 gives a list generation instruction to a list generation unit 72 (newly added in the fourth embodiment). The list generation unit 72 (newly added in the fourth embodiment), upon receiving the list generation instruction from the subject determination unit 71, generates the e-mail address list of e-mail addresses stored in the e-mail address storage unit 17, and have an image forming unit 75 print out the e-mail address list.

An e-mail generation unit 73 generates an e-mail. Particularly in the present embodiment, the e-mail generation unit 73, upon receiving a notification of e-mail address list generation process completion, generates the e-mail to be sent to the e-mail address stored in the sender's e-mail address registration unit 18 with an attached message for the purpose of notifying that the e-mail address list has been printed out. The e-mail sender unit 74 sends the e-mail generated by the e-mail generation unit 73 to the prescribed recipient's address.

The image forming unit 75 is a print engine mechanism to print out prescribed image data. Particularly in the present embodiment, the image forming unit 75 outputs the e-mail address list based on the instruction of the list generation unit 72. A control unit 76 controls the entire operation of the multifunction device. Particularly in the present embodiment, the control unit 76, upon receiving a notification of e-mail address list generation process commencement, monitors the image forming unit 75 to see if the e-mail address list has been printed. If the e-mail address list has been printed, the control unit 76 notifies the received e-mail deletion unit 21 and the e-mail generation unit 73 of the e-mail address list generation process completion.

Figure 26:
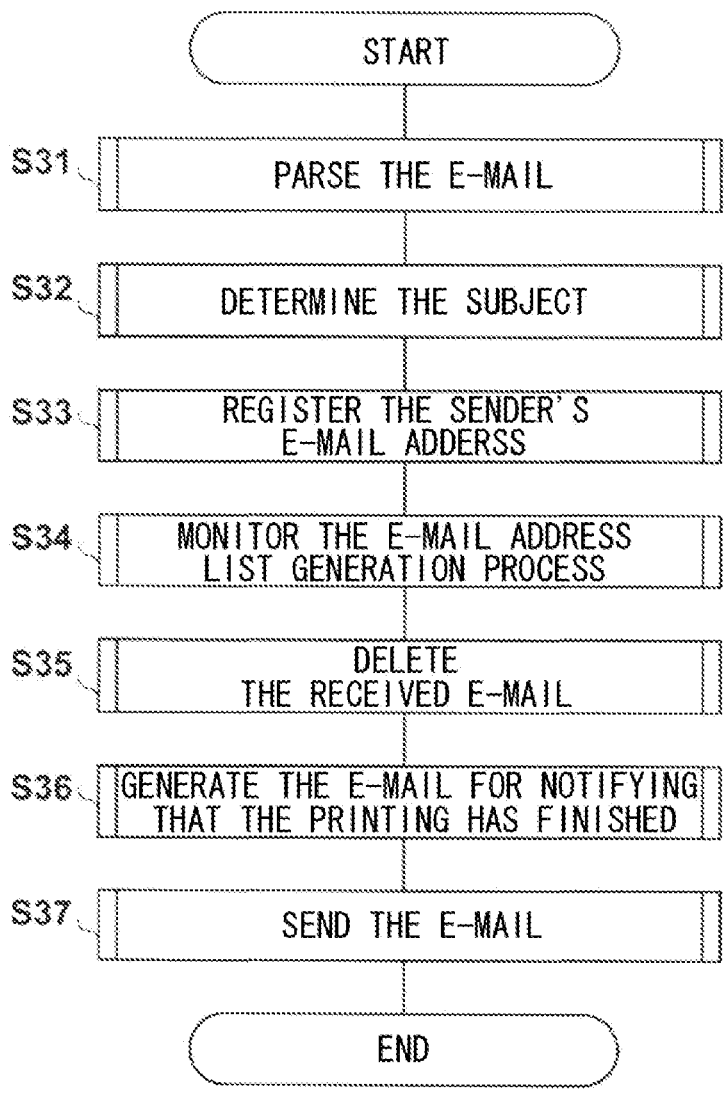
FIG. 26 is a flowchart showing an overall operation of the multifunction device according to the fourth embodiment of this invention.
Figure 27:
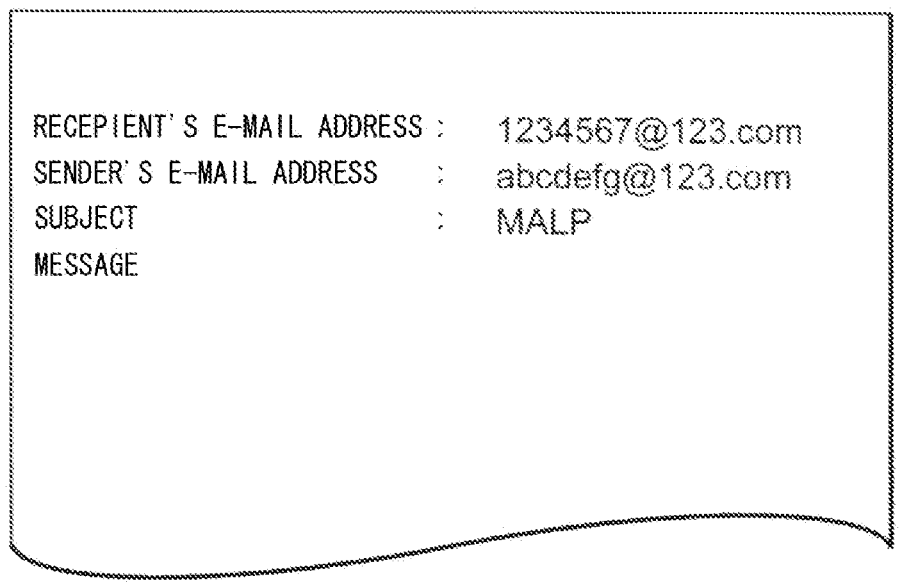
FIG. 27 is a conceptual diagram showing an e-mail received externally in the fourth embodiment of this invention.

The multifunction device 400 according to the present embodiment of this invention will be hereinafter described. FIG. 26 is the flowchart showing the overall operation of the multifunction device according to the fourth embodiment of this invention. Step S31 through step S37 will be described in details in the order of steps with reference to FIG. 25. Please note that although the multifunction device 400 according to the present embodiment can perform the e-mail address registration just as the multifunction device 100 according to the first embodiment, the e-mail address registration process is omitted from the below description to avoid redundancy, and the below description will be focused on the e-mail address list generation process. FIG. 27 is the conceptual diagram showing the e-mail received externally in the fourth embodiment of this invention.

The multifunction device 400 according to the present embodiment of this invention receives an e-mail shown in FIG. 27 from an external apparatus, not shown, via the e-mail receiver unit 11. The received e-mail is stored in the e-mail accumulation unit 12. The received e-mail can be displayed on the display unit 24 and printed by the image forming unit 75 upon the operation of the operation unit 23. The received e-mail is transferred to the e-mail parser 13, and step S31, namely, the operation of the e-mail parser 13, is performed. Step S31 is the same as step S1, namely, step S1-1 through step S1-5, described in the first embodiment, and thus the description thereof is omitted for brevity.

Figure 28:
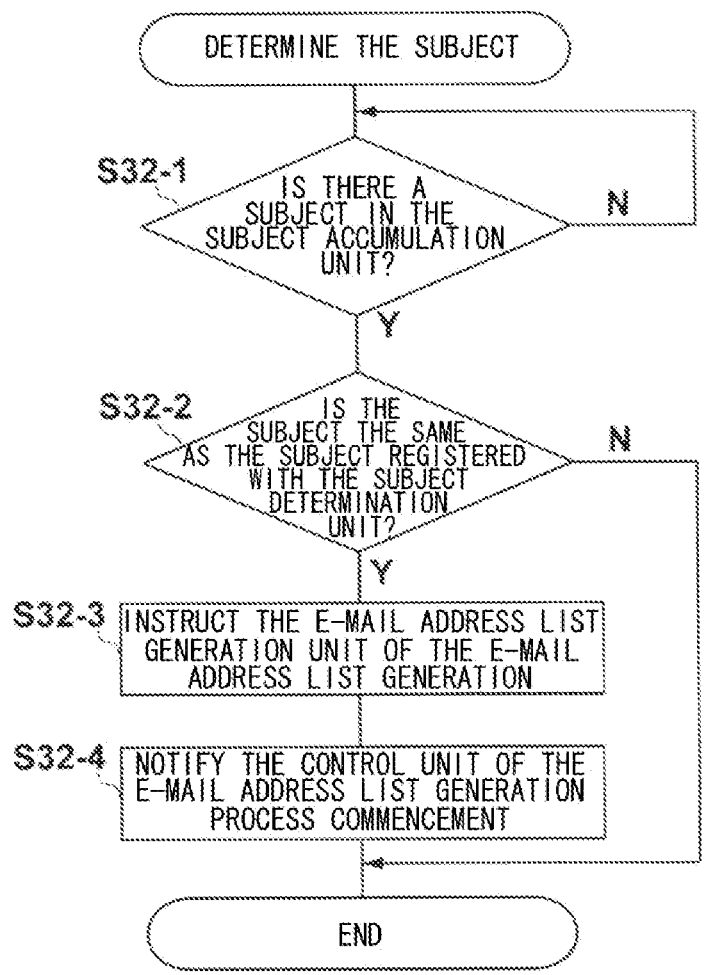
FIG. 28 is a flowchart showing the operation of the subject determination unit according to the fourth embodiment of this invention.

Referring back to FIG. 26, the subject determination unit 71 takes over the operation, and performs step S32, namely, the operation of the subject determination unit 71. Step S32 will be hereinafter described in details. FIG. 28 is the flowchart showing the operation of the subject determination unit according to the fourth embodiment of this invention.

In step S32-1, the subject determination unit 71 determines whether the subject is the same as the subject previously registered with the subject determination unit 71. Where the subject is the same thereas, step S32-3 is proceeded to. Where not, this flow is terminated. Suppose that the subject "MALP", which stands for "Mail Address List Print", is previously stored in the subject determination unit 71. In such case, the subject "MALP" of the e-mail shown in FIG. 27 is the same as the previously stored subject "MALP", and therefore, step S32-3 is proceeded to.

In step S32-3, the subject determination unit 71 notifies the list generation unit of the list generation instruction.

In step S32-4, the subject determination unit 71 notifies the control unit 76 of the e-mail address list generation process commencement, meaning that the process for generation the e-mail address list has started, and terminates this flow.

Figure 29:
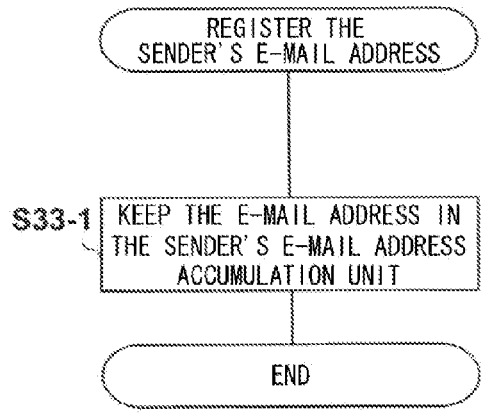
FIG. 29 is a flowchart showing the operation of the sender's e-mail address registration unit according to the fourth embodiment of this invention.

Referring back to FIG. 26, the sender's e-mail address registration unit 18 takes over the operation, and performs step S33, namely, the operation of the sender's e-mail address registration unit 18. Step S33 will be hereinafter described in details. FIG. 29 is the flowchart showing the operation of the sender's e-mail address registration unit according to the fourth embodiment of this invention.

In step S33-1, the sender's e-mail address registration unit 18 stands by keeping the e-mail address in the sender's e-mail address accumulation unit 14.

Figure 30:
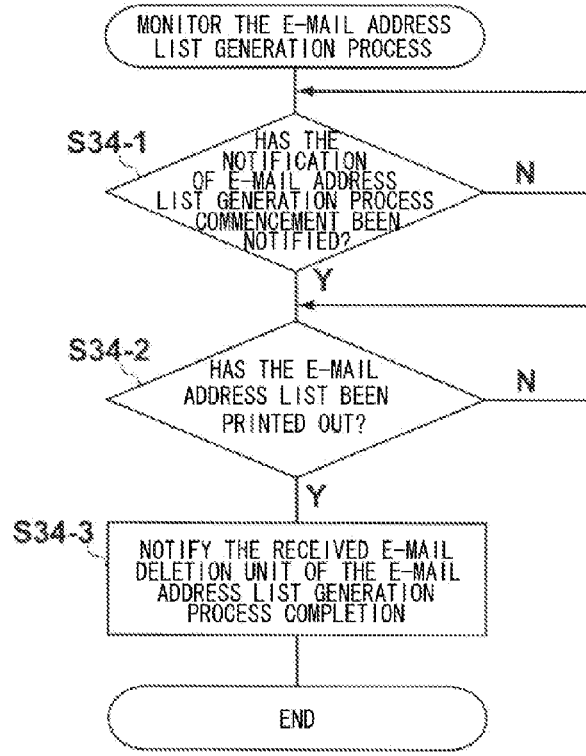
FIG. 30 is a flowchart showing the operation of the control unit monitoring an e-mail address list generation process according to the fourth embodiment of this invention.

Referring back to FIG. 26, the control unit 76 takes over the operation, and performs step S34, namely, the operation of the control unit 76 monitoring the e-mail address list generation process, from the e-mail address list generation process commencement to the e-mail address list generation process completion. Step S34 will be hereinafter described in details. FIG. 30 is the flowchart showing the operation of the control unit monitoring the e-mail address list generation process according to the fourth embodiment of this invention.

In step S34-1, the control unit 76 waits for receiving the notification of e-mail address list generation process commencement from the subject determination unit 71, and proceeds to step S34-2 upon receiving the notification.

In step S34-2, the control unit 76, upon receiving the notification, stands by monitoring the image forming unit 75. The control unit 76 proceeds to step S34-3 upon detecting the completion of e-mail address list generation process.

In step S34-3, the control unit 76 terminates this flow upon notifying the received e-mail deletion unit 21 and the e-mail generation unit 73 of the e-mail address list generation process completion meaning that the sender's e-mail address list has been printed by the image forming unit 75.

Figure 31:
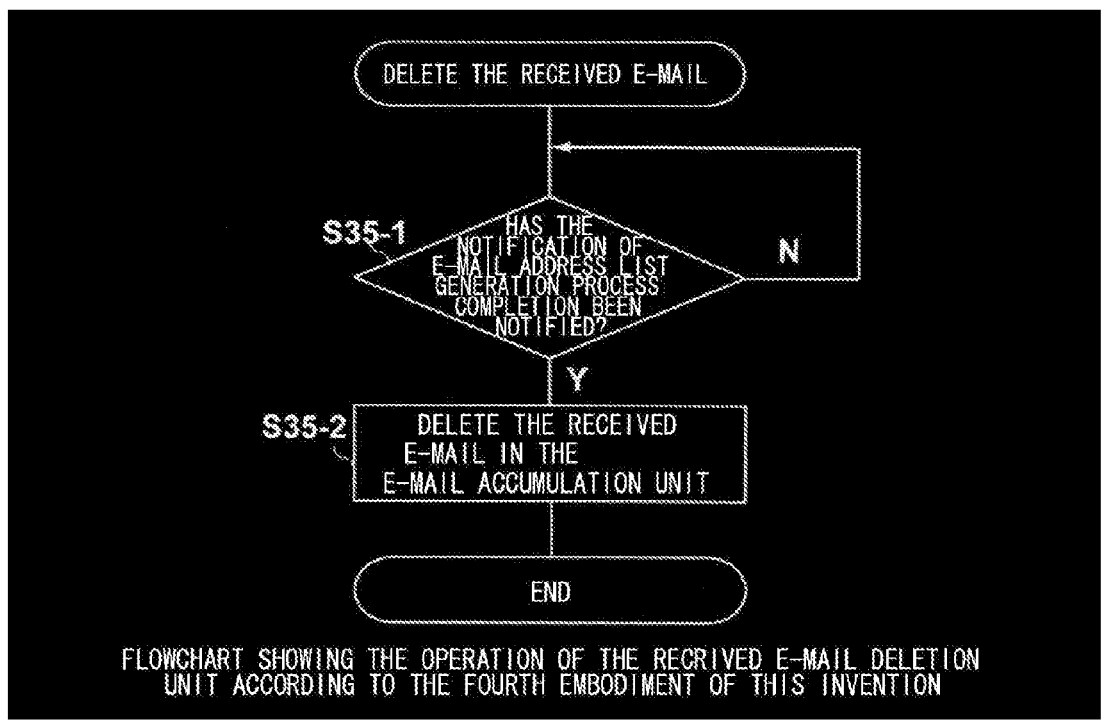
FIG. 31 is a flowchart showing the operation of the received e-mail deletion unit according to the fourth embodiment of this invention.

Referring back to FIG. 26, the received e-mail deletion unit 21 takes over the operation, and performs step S35, namely, the operation of the received e-mail deletion unit 21. Step S35 will be hereinafter described in details. FIG. 31 is the flowchart showing the operation of the received e-mail deletion unit according to the fourth embodiment of this invention.

In step S35-1, the received e-mail deletion unit 21 waits for receiving the notification of e-mail address list generation process completion from the control unit 76, and proceeds to step S35-2 upon receiving the notification.

In step S35-2, the received e-mail deletion unit 21 terminates this flow upon deleting the received e-mail stored in the e-mail accumulation unit 12.

Figure 32:
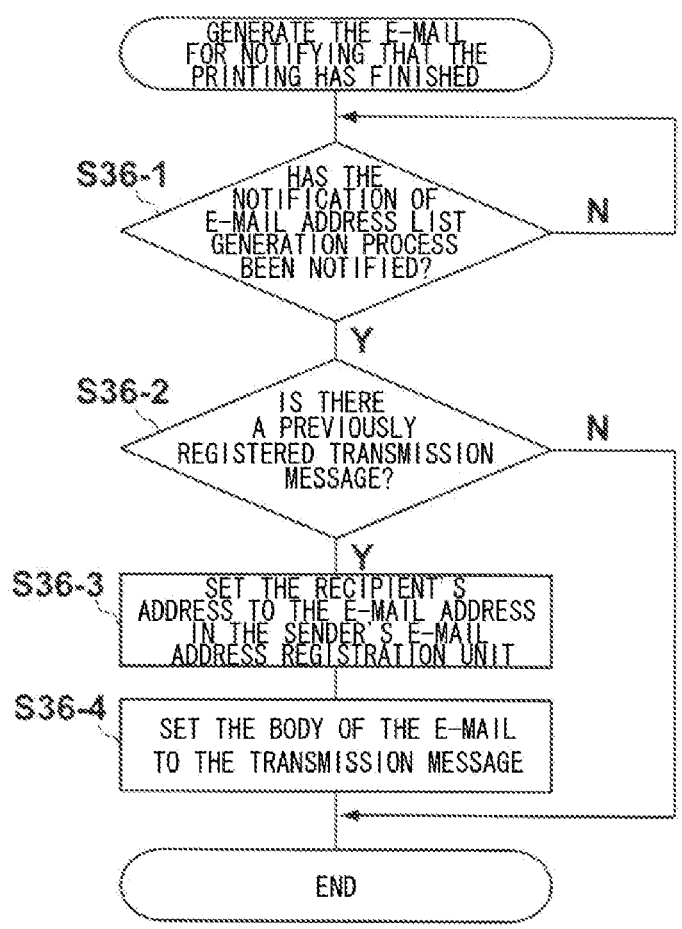
FIG. 32 is a flowchart showing the operation of the e-mail generation unit according to the fourth embodiment of this invention.

Referring back to FIG. 26, the e-mail generation unit 73 takes over the operation, and performs step S36, namely, the operation of the e-mail generation unit 73. Step S36 will be hereinafter described in details. FIG. 32 is the flowchart showing the operation of the e-mail generation unit according to the fourth embodiment of this invention.

In step S36-1, the e-mail generation unit 73 waits for the notification of e-mail address list generation process completion from the control unit 76, and proceeds to step S36-2 upon receiving the notification.

In step S36-2, the e-mail generation unit 73 determines whether a prescribed transmission message is previously stored in the e-mail generation unit 73. Where the prescribed message is stored therein, step S36-3 is proceeded to. Where not, this flow is terminated. For example, suppose that a message "Your Printing Requirement has finished", meaning that the e-mail address list has been printed, is previously stored in the e-mail generation unit 73 as a transmission message. In such case, it is proceeded to step S36-3.

In step S36-3, the e-mail generation unit 73 sets the recipient's e-mail address of the e-mail to the e-mail address stored in the sender's e-mail address registration unit 18, as described in step S33-1.

In step S36-4 the e-mail generation unit 73 terminates this flow upon setting the body of the e-mail to the transmission message. For example, the body of the e-mail is set to "Your Printing Requirement has finished".

Figure 33:
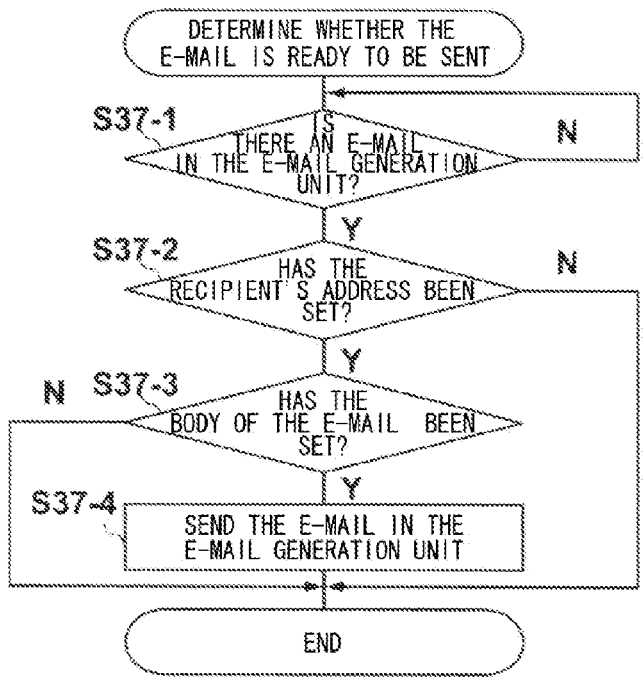
FIG. 33 is a flowchart showing the operation of the e-mail sender unit according to the fourth embodiment of this invention.

Referring back to FIG. 26, the e-mail sender unit 74 takes over the operation, and performs step S37, namely the operation of the e-mail sender unit 74. Step S37 will be hereinafter described in details. FIG. 33 is the flowchart showing the operation of the e-mail sender unit according to the fourth embodiment of this invention.

In step S37-1, the e-mail sender unit 74 monitors the e-mail generation unit 73 to see if the e-mail to be sent is contained therein. Where the e-mail to be sent is contained therein, S37-2 is proceeded to.

In step S37-2, the e-mail sender unit 74 determines whether the recipient's address has been set. Where the recipient's address has been set, it is proceeded to step S37-3. Where not, this flow is terminated.

In step S37-3, the e-mail sender unit 74 determines whether the body of the e-mail has been set. Where the body of the e-mail has been set, it is proceeded to step S37-4. Where not, this flow is terminated.

Figure 34:
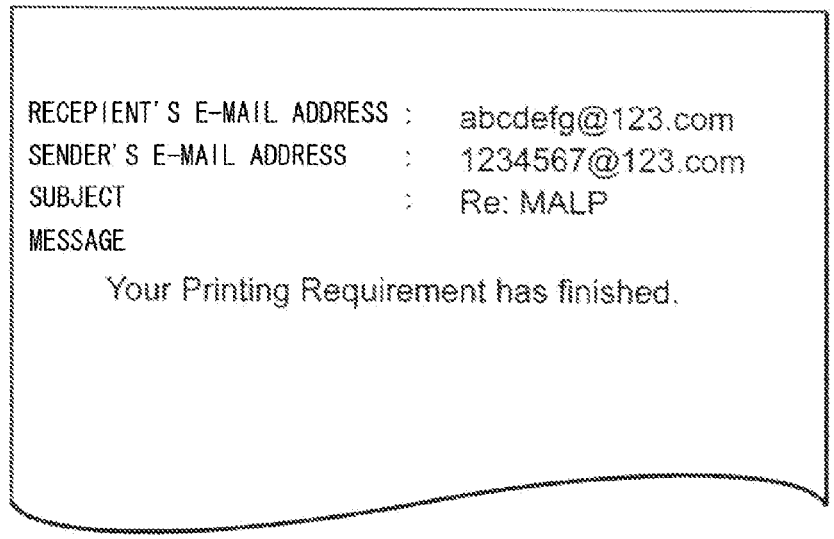
FIG. 34 is a conceptual diagram showing a print completion notification e-mail in the fourth embodiment of this invention.

In step S37-4, the e-mail sender unit 74 sends the e-mail in the e-mail generation unit 73 to the specified e-mail address. FIG. 34 is the conceptual diagram showing the print completion notification e-mail in the fourth embodiment of this invention. More particularly, FIG. 34 is the conceptual diagram showing the e-mail to be sent to the e-mail address specified by the e-mail sender unit 74 as the e-mail for notifying that the e-e-mail address list has been printed. The e-mail in FIG. 34 has the recipient's e-mail address and the sender's e-mail address having been replaced with each other when compared to the e-mail in FIG. 27, and furthermore, the e-mail in FIG. 34 has the subject "Re: MALP" meaning the completion of printing and the body "Your Printing Requirement has finished".

As hereinabove described, the fourth embodiment enables the user to print out the e-mail address list stored in the e-mail address storage unit 17 and to review the e-mail address list before the user additionally registers (as described in the first embodiment) or deletes the registration (as described in the second embodiment) of the user's own e-mail address. Thus, a highly convenient multifunction device is provided.

In the first embodiment, the subject determination unit 16 (FIG. 1) has a function to determine whether the subject extracted from the received e-mail is the same as the previously registered subject, registered by a subject registration function, and to register the sender's e-mail address with the e-mail address storage unit 17 (FIG. 1). However, the multifunction device can also be easily configured to allow the body of the e-mail, instead of the subject, to include the instruction information so as to achieve a similar function where the instruction information extracted from the body of the received e-mail is the same as the previously registered instruction information. Furthermore, although alphabetical letters, such as "MARR", in the subject are recognized in the described embodiments, it can also be configured to use characters and marks, such as, e.g., a star and a black circle, to obtain a similar function.

In the second embodiment, the e-mail addresses are displayed in alphabetical order. However, it can also be easily configured to enable to the e-mail address list to be sorted in reverse alphabetical order, in the order of e-mail address registration time, in the reverse order thereof, in Japanese hiragana order, or in the order of vowels or consonants previously defined in each country.

In the third embodiment, the subject determination unit 54 (FIG. 15) has a function to determine whether the subject extracted from the received e-mail is the same as the previously registered subject, registered by the subject registration function, and to delete the registration of sender's e-mail address from the e-mail address storage unit 17 (FIG. 15). However, the multifunction device can also be easily configured to allow the body of the e-mail, instead of the subject, to include the instruction information so as to achieve a similar function where the instruction information extracted from the body of the received e-mail is the same as the previously registered instruction information.

Although this invention is herein described where the invention is applied to the multifunction device capable of reading and forming images, this invention is not limited to the described embodiment. That is, this invention can be applied to any communication terminal apparatuses having a function to send and receive e-mails.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A communication terminal apparatus adapted to send and receive an e-mail, comprising:
    a plurality of various kinds of e-mail address storage units storing recipient information of an e-mail address;
    a mail analysis unit for analyzing whether the subject area of a received e-mail includes a first prescribed symbol;
    an e-mail address acquisition unit for acquiring a sender's e-mail address from the received e-mail; and
    an e-mail address registration unit for registering the sender's e-mail address of the received e-mail with one of the plurality of various kinds of e-mail address storage units upon selecting the one of the plurality of various kinds of e-mail address storage units for registering the sender's e-mail address of the received email from among the plurality of various kinds of email address storage units based on an address designation location included in the subject area, where the subject area of the received e-mail includes the first prescribed symbol.

2. The communication terminal apparatus according to claim 1, wherein the first prescribed symbol is a prescribed string.

3. The communication terminal apparatus according to claim 1, wherein the first prescribed symbol is a prescribed mark.

4. The communication terminal apparatus according to claim 1, wherein the e-mail address registration unit sends a registration completion e-mail to the sender of the received e-mail.

5. The communication terminal apparatus according to claim 1, wherein the address designation location includes information of a one-touch dial number.

6. The communication terminal apparatus according to claim 1, wherein the sender's e-mail address is deleted from the e-mail address storage unit where the subject area of the received e-mail includes a second prescribed symbol.

7. The communication terminal apparatus according to claim 1, further comprising:
    an e-mail deletion unit for deleting the received e-mail upon receiving an e-mail address registration completion notification from the e-mail address registration unit.

8. The communication terminal apparatus according to claim 1, further comprising:
    a control unit for monitoring the e-mail address storage units upon receiving a notification of e-mail address registration process commencement from a subject determination unit and for notifying a received e-mail deletion unit and an e-mail generation unit of the e-mail address registration process completion when the sender's e-mail address has been registered with an e-mail address storage unit.

9. The communication terminal apparatus according to claim 1, further comprising:
    an image scanner unit for retrieving image data from a document; and
    an image generation unit for printing prescribed image data.

10. The communication terminal apparatus according to claim 1, wherein said plurality of various kinds of e-mail address storage units comprise at least one of: ordinary address memory, abbreviated address memory, and one-touch address memory.

11. A communication terminal apparatus adapted to send and receive an e-mail, comprising:
    a plurality of various kinds of e-mail address storage units storing recipient information of an e-mail address;
    a mail analysis unit for analyzing whether the subject area of a received e-mail includes a first prescribed symbol;
    an e-mail address acquisition unit for acquiring a sender's e-mail address from the received e-mail;
    an e-mail address registration unit for registering the sender's e-mail address of the received e-mail with one of the plurality of various kinds of e-mail address storage units upon selecting the one of the plurality of various kinds of e-mail address storage units for registering the sender's e-mail address of the received e-mail from among the plurality of various kinds of e-mail address storage units based on an address designation location included in the subject area, where the subject area of the received e-mail includes the first prescribed symbol; and an e-mail deletion unit for deleting the received e-mail upon receiving an e-mail address registration completion notification from the e-mail address registration unit.

* * * * *